United States Patent
Yanagawa

(10) Patent No.: US 6,667,992 B1
(45) Date of Patent: Dec. 23, 2003

(54) NETWORK CONTROL SYSTEM

(75) Inventor: Yoshifumi Yanagawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/269,800

(22) PCT Filed: Aug. 4, 1998

(86) PCT No.: PCT/JP98/03448

§ 371 (c)(1),
(2), (4) Date: Apr. 1, 1999

(87) PCT Pub. No.: WO99/07114

PCT Pub. Date: Feb. 11, 1999

(30) Foreign Application Priority Data

Aug. 4, 1997 (JP) .............................................. 9-208825

(51) Int. Cl.[7] .............................................. H04L 29/02
(52) U.S. Cl. ......................... 370/490; 345/733; 709/203
(58) Field of Search ................................. 370/489, 490, 370/493, 254; 345/733, 734, 735, 736; 709/203, 223; 725/37

(56) References Cited

U.S. PATENT DOCUMENTS

| | | | | |
|---|---|---|---|---|
| 5,694,544 A | * | 12/1997 | Tanigawa et al. | 345/753 |
| 5,778,377 A | * | 7/1998 | Marlin et al. | 707/103 R |
| 5,825,432 A | * | 10/1998 | Yonezawa | 348/563 |
| 5,883,621 A | * | 3/1999 | Iwamura | 725/37 |
| 5,887,193 A | | 3/1999 | Takahashi et al. | |
| 5,990,884 A | * | 11/1999 | Douma et al. | 345/716 |
| 6,046,722 A | | 4/2000 | McKiel, Jr. | |
| 6,182,094 B1 | * | 1/2001 | Humpleman et al. | 715/513 |
| 6,259,679 B1 | * | 7/2001 | Henderson et al. | 370/254 |
| 6,288,716 B1 | * | 9/2001 | Humpleman et al. | 345/733 |
| 6,370,550 B1 | * | 4/2002 | Douma et al. | 715/500.1 |

FOREIGN PATENT DOCUMENTS

| | | |
|---|---|---|
| JP | 5-233188 | 9/1993 |
| JP | 7-44477 | 2/1995 |
| JP | 8-65764 | 3/1996 |
| JP | 8-168085 | 6/1996 |
| JP | 2588220 | 12/1996 |
| JP | 9-128888 | 5/1997 |
| JP | 9-149325 | 6/1997 |
| JP | 9-187085 | 7/1997 |
| JP | 9-326799 | 12/1997 |

OTHER PUBLICATIONS

English Abstract of Japanese 6–59989, Dean Drako et al., "Architecture for Transferring Pixel Streams".
Patent Abstracts of Japan, Publication No. 08044643, Feb. 16, 1996, Ryusuke Masuoka et al., "Gateway Device".
Patent Abstracts of Japan, Publication No. 09223400, Aug. 26, 1997, Yasuyuki Okamoto et al., "Testing Device, Testing Method and Memory Device for Semiconductors".

* cited by examiner

Primary Examiner—Min Jung
(74) Attorney, Agent, or Firm—Wenderoth, Lind & Ponack, L.L.P.

(57) ABSTRACT

A network control system capable of flexibly constructing an operational environment suitable for each function and equipment in a simple configuration with a light load on a transmission line and each equipment and readily adaptable to a new function not conceivable at present. To attain the above object, the network control system controls at least one piece of equipment from another piece of equipment through a transmission line in a system in which a plurality of equipment is interconnected over the transmission line. The network control system comprises a controller having a user interface and a device having a function list indicating functions thereof as constituents in any equipment connected to the transmission line. The device transmits the function list through the transmission line. The controller notifies information about the device to user using the received function list, and controls the device utilizing the function list in accordance with a user's operation.

9 Claims, 16 Drawing Sheets

Fig. 8

| ADDRESS | | | |
|---|---|---|---|
| =430H | LENGTH | | CRC |
| 434H | 12H | NODE SPEC ID | |
| 438H | 13H | NODE SW VERSION | |
| | ... | | |
| 440H | FAH | FUNCTION TABLE ENTRY | |
| | ... | | |
| 800H | LENGTH | | CRC |
| 804H | 81H | DEVICE NAME ENTRY | |
| 808H | 02H | DEVICE TYPE | |
| 80CH | 83H | MODEL NAME ENTRY | |
| 810H | 8DH | UNIQUE ID ENTRY | |
| 814H | 04H | SUPPORT LEVEL/MAXIMUM TRANSFER AMOUNT | |
| 818H | 05H | FUNCTION TABLE SIZE | |
| 81CH | C6H | DEVICE GUI ENTRY | |
| 820H | CCH | FUNCTION INFORMATION ENTRY | |
| 824H | CCH | FUNCTION INFORMATION ENTRY | |
| | ... | | |
| 830H | LENGTH | | CRC |
| | DEVICE NAME | | |
| | ... | | |
| 840H | LENGTH | | CRC |
| | MODEL NAME | | |
| | ... | | |
| 850H | LENGTH | | CRC |
| | UNIQUE ID | | |
| | ... | | |
| 900H | LENGTH | | CRC |
| 904H | 90H | FUNCTION NAME ENTRY | |
| 908H | 11H | FUNCTION TYPE | |
| 90CH | 12H | FUNCTION ID | |
| 910H | 94H | COMMAND ENTRY | |
| 914H | D5H | FUNCTION GUI ENTRY | |
| 918H | D5H | FUNCTION GUI ENTRY | |
| | ... | | |
| 920H | LENGTH | | CRC |
| | FUNCTION NAME | | |
| | ... | | |
| 930H | LENGTH | | CRC |
| | COMMAND | | |
| | ... | | |
| | LENGTH | | CRC |
| A00H | 16H | GUI TYPE | |
| A04H | 17H | AUDIO REPRODUCTION FLAG | |
| A08H | 98H | AUDIO DATA ENTRY | |
| A0CH | 19H | STILL PICTURE DISPLAY FLAG | |
| A10H | 9AH | DISPLAY STILL PICTURE ENTRY | |
| A14H | 9AH | DISPLAY STILL PICTURE ENTRY | |
| | ... | | | ns
NETWORK CONTROL SYSTEM

TECHNICAL FIELD

The present invention relates to network control systems for operating over network equipment interconnected on networks, and more specifically to an equipment control system providing, on a screen, a graphical user interface (GUI) for supporting user's operation of equipment by means of graphics, characters and the like.

BACKGROUND ART

In recent years, an equipment control system which displays on a TV screen graphics (icon) comprising of screen display data, characters and the like for representing the functions of equipment and controls the equipment based on user's operation of selecting and manipulating the graphics with a TV remote controller has been introduced. Moreover, a networked system interconnecting digital equipment such as DVC (digital video cassette) therein using the IEEE standard 1394-1995 to transmit and receive video/audio data is also in use.

One of conventional network control systems is disclosed in Japanese Patent Laying-Open No. 9-149325.

An example of the conventional network control systems is described below.

AV equipment is connected with another AV equipment on a serial bus, such as a digital interface, for example, the IEEE standard 1394 and the like, over which the AV equipment is provided with equal communication opportunities at periodic time intervals in two-way packet communication mode without switching connection therebetween.

Here, each AV equipment contains peculiar screen display data therein, to transmit the screen display data to a controller (for example, a television set) having the function of displaying graphics in response to a request from the controller. The controller then displays the screen display data.

Besides, the controller also has the functions of making inquiries about the data required for displaying the AV equipment connected thereto, and controlling display on a screen generated based on the screen display data supplied from the AV equipment.

Each AV equipment has a storage medium storing the screen display data thereon, and the function of selecting appropriate screen display data in response to the inquiry about screen display data from the controller.

In the network control system configured as above, the screen display data is saved in each device (AV equipment), and outputted in response to the display request from the controller (television set). The graphics peculiar to each device (AV equipment) is thus displayed on the screen of the controller.

In the network control system with the above configuration, however, when the screen display data is required, for example, when the displayed graphics, for representing the device, such as an icon is changed by user's operation, the controller must inquire the screen display data about the device through a transmission line. This leads to a problem that the traffic on the transmission line increases and much time is spent for displaying the data.

Moreover, the network control system has another problem that the device is required to have the function of selecting appropriate screen display data in response to the inquiry from the controller, which results in heavy processing load on the device.

Furthermore, the network control system has a further problem that the screen display data is peculiar to each AV equipment and therefore has little flexibility in display on the controller.

The present invention solves the above-described problems. That is, an object of the present invention is to provide a network control system capable of flexibly constructing an operational environment suitable for each function and equipment in a simple configuration with a light load on a transmission line and each equipment and readily adapting to even a new function not conceivable at present and further to equipment having a plurality of devices.

DISCLOSURE OF THE INVENTION

A first aspect of the present invention is directed to a network control system in which a plurality of equipment connected through a transmission line, and first equipment controls second equipment through the transmission line, wherein:

at least one of the first and second equipment handles at least one of video, audio and information;

the first equipment includes a controller having a user, interface;

the second equipment includes a device to be controlled by the, controller;

the device has function information indicating functions of the device, itself; and the controller acquires the function information from the device through the transmission line, and controls the device through the transmission line through the use of the function information according to a user's operation performed by means of the user interface.

According to the first aspect of the present invention, provided are a controller having a user interface, a device having function information indicating its own functions. The device transmits the function information to the controller through a transmission line, and the controller notifies information about the device to a user through the use of the function information and controls the device according to the user's operation, whereby a user-friendly operational environment can be realized in a simple configuration and it is possible to readily adapt to a device having a new function not conceivable at present.

A second aspect is directed to second equipment, connected to first equipment including a controller through a transmission line, including a device to be controlled by the controller through the transmission line:

at least one of the first and second equipment handling at least one of video, audio and information; and wherein the device:

has function information indicating functions of the device;

sends the function information to the transmission line in response to a request from the controller; and operates in accordance with control performed by the controller on a basis of the function information to realize the functions of the device.

The equipment according to the second aspect of the present invention can be used as second equipment including the device to be controlled in the network control system according to the first aspect of the present invention.

A third aspect of the present invention is directed to first equipment, connected to second equipment through a transmission line, including a controller controlling a device included in the second equipment through the transmission line:

at least one of the first and second equipment handling at least one of video, audio, and information; and wherein the controller:

comprises a user interface;

acquires function information indicating functions of the device from the device through the transmission line; and controls the device through the transmission line through the use of the function information according to a user's operation performed by means of the user interface.

The equipment according to the third aspect of the present invention can be used as first equipment including the controller in the network control system according to the first aspect of the present invention.

According to fourth aspect of the present invention, in the first aspect of the present invention, the function information has a layer structure, and includes a device information layer composed of attribute information including identification information of the device, and function information layer indicating the functions of the device.

According to the fourth aspect of the present invention, a device information layer composed of attribute information including identification information of the device, and function information layer indicating the functions of the device are provided in the function information. Therefore, it is possible to optimize both an operational environment for each device and an operational environment for each function of the device, and realize a user-friendly operational environment.

According to a fifth aspect of the present invention, in the first aspect of the present invention, the device includes a plurality of sub-devices, and the function information has layer structure, and includes a device information layer composed of attribute information including identification information of the device, a sub-device information layer composed of attribute information including identification information of the sub-devices, and function information layer indicating the functions of the sub-device.

According to the fifth aspect of the present invention, a device information layer indicating information about the device, a sub-device information layer indicating information about the sub-devices in the device, and a function information layer indicating the functions of the sub-devices are provided. Consequently, appropriate operational environment can be provided for each sub-device in each device, and the device can be controlled from different controllers for each sub-device.

According to a sixth aspect of the present invention, in the first aspect of the present invention, the function information includes user interface information.

According to a seventh aspect of the present invention, in the fourth or fifth aspect of the present invention, the function information includes a device GUI layer composed if user interface information of the functions in the function information layer.

According to a ninth aspect of the present invention, in the fifth aspect of the present invention, the function information has a sub-device GUI layer composed of user interface information of sub-devices identified with the attribute information in the sub-device information layer.

According to the seventh, eighth, ninth aspects of the present invention, a device GUI layer, function GUI layer, and sub-device GUI layer describing user interface information of the device indicated in a device information layer, a function information layer, and sub-device are included. This makes it possible to constructs flexible user interface for each hierarchy and realize an optimal operational environment for each device, function, and sub-device.

According to a tenth aspect of the present invention, in the fourth or fifth aspect of the present invention, an identifier is provided for each of the functions in the function information layer.

According to the tenth aspect of the present invention, an identifier is provided for each function described in the function information layer, and thereby making identification and retrieval of the functions easier when managing/consulting function information with the controller.

According to an eleventh aspect of the present invention, in the seventh, eighth or ninth aspect of the present invention, information in the device GUI layer, the function GUI layer or the sub-device GUI layer is classified according to user's operation and a status of the device.

According to the eleventh aspect, the device GUI layer, the function GUI layer or the sub-device GUI layer is classified according to user's operation and a status of the device. Therefore, a user-friendly and easy-to-understand operational environment can be readily constructed.

According to a twelfth aspect of the present invention, in the first aspect of the present invention, the function information includes a control code corresponding to each of the functions which the device has, and when the controller transmits the control code included in the function information to the device through the transmission line, the device operates in accordance with the control code to realize a function corresponding to the control code.

According to the twelfth aspect of the present invention, the controller does not necessarily have to understand each function of a device to be controlled since the controller acquires from the device the function information including a control code which can be interpreted and executed by the device. For example, as for a device having a new function not conceivable at present, the controller can make the device execute the new function by referring to the function information of the device and transmitting the control code to the device according to the user's operation performed by means of the user interface. Accordingly, the user can execute a new function not conceivable at present.

According to a thirteenth aspect of the present invention, in the second aspect of the present invention, the function information includes a control code corresponding to each of the functions of the device, and the device sends the function information to the transmission line in response to the predetermined request from the controller, and operates in accordance with the control code received from the controller, to realize a function corresponding to the control code.

The equipment according to the thirteenth aspect of the present invention can be used as second equipment including the device to be controlled in the network control system according to the twelfth aspect of the present invention.

According to a fourteenth aspect of the present invention, in the third aspect of the present invention, the controller acquires the function information including a control code corresponding to each of the functions of the device from the device through the transmission line, and sends the control code in the function information to the device through the transmission line according to the user's operation performed by means of the user interface, to control the device.

The equipment according to the fourteenth aspect of the present invention can be used as first equipment including the controller in the network control system according to the twelfth aspect of the present invention.

According to a fifteenth aspect of the present invention, in the first aspect of the present invention, the function information includes display data representing each of the functions of the device, and the controller includes display means for displaying the functions of the device through the use of the display data.

According to the fifteenth aspect of the present invention, the function information has display data representing each function of the device, whereby optimal screen display can be presented for each function of the device and a user-friendly operational screen display can be realized.

According to a sixteenth aspect of the present invention, in the second aspect of the present invention, the function information includes display data representing each of the functions of the device, and the device sends the function information to the transmission line in response to the predetermined request from the controller, and operates in accordance with the control performed by the controller on the basis of the function information, to realize the functions of the device.

The equipment according to the sixteenth aspect of the present invention can be used as second equipment including the device to be controlled in the network control system according to the fifteenth aspect of the present invention.

According to a seventeenth aspect of the present invention, in the third aspect of the present invention, the controller comprises display means as the user interface, and acquires the function information including display data representing each of the functions of the device with the display means through the use of the display data, to control the device through the transmission line through the use of the function information according to the user's operation performed by means of the user interface.

The equipment according to the seventeenth aspect of the present invention can be used as first equipment including the controller in the network control system according to the fifteenth aspect of the present invention.

According to an eighteenth aspect of the present invention, in the fifteenth aspect of the present invention:
  the function information includes a control code corresponding to each of the display data;
  the controller displays each of the functions of the device with the display means through the use of the display data included in the function information, and transmits the control code corresponding to the display data through the transmission line to the device according to the user's operation performed by means of the user interface for the display data; and
  the device operates in accordance with the control code received from the controller through the transmission line, to realize a function indicated by the display data corresponding to the control code.

According to the eighteenth aspect, the controller does not necessarily have to understand each function of the device since the controller acquires from the device the function information including display data representing each function of the device and a control code corresponding to each of the display data. For example, as for a device having a new function not conceivable at present, the controller can fetch from the function information display data representing the new function and displays the same on the screen to notify the user. Then, when the user understands the new function from graphics and the like on the screen and selects the function, the controller refers to the function information, then obtains a control code corresponding to the new function, and transmits the control code to the device, to make the device execute the new function. Accordingly, the user can execute even a new function not conceivable at present.

According to a nineteenth aspect of the present invention, in the sixteenth aspect of the present invention, the function information includes a control code corresponding to each of the display data, and the device sends the function information to the transmission line in response to the predetermined request from the controller, and operates in accordance with the control code received from the controller, to realize a function indicated by the display data corresponding to the control code.

The equipment according to the nineteenth aspect of the present invention can be used as second equipment including the device to be controlled in the network control system according to the eighteenth aspect of the present invention.

According to a twentieth aspect of the present invention, in the seventeenth aspect of the present invention, the controller acquires the function information including the display data representing each of the functions of the device and a control code corresponding to each of the display data, displays each of the functions of the device through the use of the display data with the transmission line according to the user's operation performed by means of the user interface for the display data, to control the device.

The equipment according to the twentieth aspect of the present invention can be used as first equipment including the controller in the network control system according to the eighteenth aspect of the present invention.

According to a twenty-first aspect of the present invention, in the eleventh aspect of the present invention, the device GUI layer, or the sub-device GUI layer includes display data for each of the classified categories, and the controller comprises display means for displaying the user interface of the device, the function, or the sub-device for each of the categories through the use of the display data.

According to the twenty-first aspect of the present invention, the device GUI layer, function GUI layer or sub-device GUI layer has display data for each category, whereby optimal screen display can be presented for each category. As a result, it is possible to provide an operational screen which can deepen the user's intuitive understanding and support the user's operation.

According to a twenty-second aspect of the present invention, in the first aspect of the present invention, the function information includes audio data for the user interface, and the controller includes audio reproducing means for reproducing audio through the use of the audio data.

According to the twenty-second aspect of the present invention, the function information has audio data used for the user interface. This makes it possible to provide the user with appropriate audio information for each device and function and realize a user-friendly operational environment.

According to a twenty-third aspect of the present invention, in the eleventh aspect of the present invention, the device GUI layer, the function GUI layer, of the sub-device GUI layer includes audio data for each of the classified categories, and the controller comprises audio reproducing means for reproducing audio as the user interface of the device, the function, or the sub-device for each of the categories through the use of the audio data.

According to the twenty-third aspect of the present invention, the device GUI layer, function GUI layer, or sub-device GUI layer has audio data for each category, whereby appropriate audio information can be provided to the user for each category. This supports/facilitates the user's understanding.

According to a twenty-fourth aspect of the present invention, in the first aspect of the present invention:

the function information includes a control code corresponding to each of the functions of the device;
the device comprises:
a device communication means for communicating with the controller through the transmission line; and
a first control means for sending the function information to the transmission line in response to a predetermined request received from the controller with the device communication means, and making the device communication means; and
the controller comprises:
a controller communication means for communicating with the device through the transmission line; and
a second control means for acquiring the function information from the device by transmitting the predetermined request to the device with the controller communication means, and for controlling the device by transmitting the control code in the function information with the controller communication means according to the user's operation performed by means of the user interface.

According to a twenty-fifth aspect of the present invention, in the aspect of the present invention, the device comprises:
a storage means containing therein the function information including a control code corresponding to each of the functions of the device;
a communication means for communicating with the controller through the transmission line; and
a control means for sending the function information to the transmission line in response to the predetermined request received from the controller with the communication means, and making the device operate in accordance with the control code received from the controller with the communication means.

The equipment according to the twenty-fifth aspect of the present invention can be used as second equipment including the device to be controlled in the network control system according to the twenty-fourth aspect of the present invention.

According to a twenty-sixth aspect of the present invention, in the third aspect of the present invention, the controller comprises:
a communication means for communication with the device through the transmission line; and
a control means for acquiring from the device the function information including a control code corresponding to each of the functions of the device by transmitting a predetermined request to the device with the communication means, and for controlling the device by transmitting the control code in the function information with the communication means according to the user's operation performed by means of the user interface.

According to a twenty-seventh aspect of the present invention, in the first aspect of the present invention:
the function information includes display data representing each of the functions of the device;
the device comprises:
a device communication means for communicating with the controller through the transmission line; and
a first control means for sending the function information to the transmission line with the device communication means in response to a predetermined request received from the controller, and making the device operate in accordance with control information received from the controller with the device communication means; and
the controller comprises:
a display means for the user interface;
a controller communication means for communicating with the device through the transmission line; and
a second control means for acquiring the function information from the device by transmitting the predetermined request to the device with the controller communication means, for displaying each of the functions of the device with the display means through the use of the display data included n the function information, and for controlling the device by transmitting the control information on the basis of the function information with the controller communication means according to the user's operation by means of the user interface.

According to a twenty-eighth aspect of the present invention, in the second aspect of the present invention, the device comprises:
a storage means containing therein the function information including display data representing each of the functions of the device;
a communication means for communicating with the controller through the transmission line; and
a control means for sending the function information to the transmission line in response to a predetermined request received from the controller with the communication means, and making the device operate in accordance with control information received from the controller with the communication means.

According to a twenty-ninth aspect of the present invention, in the third aspect of the present invention, the controller comprises:
a display means for the user interface;
a communication means for communicating with the device through the transmission line; and
a control means for acquiring from the device the function information including display data representing each of the functions of the device by transmitting a predetermined request to the device with the communication means, for displaying each of the functions of the device with the display means through the use of the display data, and for controlling the device by transmitting control information on the basis of the function information with the communication means according to the user's operation performed by means of the user interface.

The equipment according to the twenty-ninth aspect of the present invention can be used as first equipment including the controller in the network control system according to the twenty-seventh aspect of the present invention.

According to a thirtieth aspect of the present invention, in the twenty-seventh aspect of the present invention:
the function information includes a control code corresponding to each of the display data;
the first control means in the device makes the device operate in accordance with the control code received from the controller with the device communication means to realize a function represented by the display data corresponding to the control code; and
the second control means in the controller displays each of the functions of the device with the display means through the use of the display data included in the function information acquired from the device with the controller communication means, and transmits the control code corresponding to the display data with the controller communication means according to the user's operation performed by means of the user interface for the display data.

According to a thirty-first aspect of the present invention, in the thirtieth aspect of the present invention, the second control means in the controller, when any one of the display data is selected by the user based on display provided by the display means, transmits the control code corresponding to the selected display data with the controller communication means.

According to a thirty-second aspect of the present invention, in the thirtieth aspect of the present invention, the function information includes on e or a plurality of control code corresponding to each of the display data.

According to thirty-third aspect of the present invention, in the twenty-seventh aspect of the present invention, the display data of a plurality of still pictures, and the display means in the controller sequentially displays the plurality of still pictures through the use of the display data while switching the still pictures at a substantially constant time interval.

According to the thirty-third aspect of the present invention, display data composed of data of a plurality of still pictures is included in the function information, and the controller sequentially displays the plurality of still picture data while switching the data at a substantially constant time interval. Thus, quasi-motion pictures can be displayed on the screen without an execution code operating in the controller, and more easy-to-understand operational environment can be provided independently of the structure of the controller (the type of CPU and the like).

According to a thirty-fourth aspect of the present invention, in the twenty-seventh aspect of the present invention:
  the display data is data of a plurality of still pictures;
  the function information includes display control information indicating a display method of the plurality of still pictures; and
  the display means in the controller displays the plurality of still pictures through the use of the display data in accordance with the display control information.

According to the thirty-fourth aspect of the present invention, display data composed of data of a plurality of still pictures and display control information indicating a display method of the plurality of still picture data are included in the function information. This makes it possible to appropriately display quasi-motion pictures and still pictures according to each scene, and specify a reproducing speed and the like of the quasi-motion pictures. Consequently, the user can readily understand the intention of a creator of the user interface such as a GUI.

According to a thirty-fifth aspect of the present invention, in the twenty-eighth aspect of the present invention:
  the function information includes a control code corresponding to each of the display data; and
  the control means makes the device operate in accordance with the control code received from the controller with the communication means, to realize a function represented by the display data corresponding to the control code.

The equipment according to the thirty-fifth aspect of the present invention can be used as second equipment including the device to be controlled in the network control system according to the thirtieth aspect of the present invention.

According to a thirty-sixth aspect of the present invention, in the twenty-ninth aspect of the present invention, the control means acquires with the communication means the function information including the display data representing each of the functions of the device and a control code corresponding to each of the display data, displays each of the functions of the device with the display means through the use of the display data, and transmits the control code corresponding to the display data with the communication means according to the user's operation performed by means of the user interface for the display data, to control the device.

According to a thirty-seventh aspect of the present invention, in the first aspect of the present invention:
  the function information includes audio data for the user interface;
  the device comprises:
    a device communication means for communicating with the controller through the transmission line; and
    a first control means for sending the function information of the transmission line in response to a predetermined request received from the controller with the device communication means, and making the device operate in accordance with control information received from the controller with the device communication means; and
  the controller comprises:
    an audio reproducing means for reproducing audio from audio data;
    a controller communication means for communicating with the device through the transmission line; and
    a second control means for acquiring the function information from the device by transmitting the predetermined request to the device with the controller communication means, for reproducing audio with the audio reproducing means through the use of the audio data included in the function information, and for controlling the device by transmitting control information on the basis of the function information with the controller communication means according to the user's operation performed by means of the user interface.

According to a thirty-eighth aspect of the present invention, in the second aspect of the present invention, the device comprises:
  a storage means containing therein the function information including audio data for a user interface;
  a communication means for communicating with the controller through the transmission line; and
  a control means for sending the function information to the transmission line in response to the predetermined request received from the controller with the communication means, and making the device operate in accordance with control information received from the controller with the communication means.

The equipment according to a thirty-eighth aspect of the present invention can be used as second equipment including the device to be controlled in the network control system according to the thirty-seventh aspect of the present invention.

According to a thirty-ninth aspect of the present invention, in the third aspect of the present invention, the controller comprises:
  an audio reproducing means for reproducing audio from audio data;
  a communication means for communicating with the device through the transmission line; and a control means for acquiring from the device the function information including the audio data for the user interface by transmitting a predetermined request to the device with the communication means, for reproducing audio with the audio reproducing means through the use of the audio data included in the function information, and for controlling the device by transmitting control information on the basis of the function information with the communication means according to the user's operation performed by means of the user interface.

The equipment according to a thirty-ninth aspect of the present invention can be used as first equipment including the controller in the network control system according to the thirty-seventh aspect of the present invention.

According to the fortieth aspect of the present invention, in the thirty-seventh aspect of the present invention:

the function information includes the audio data for the user interface and reproduction control information indicating a reproduction method of the audio data; and the audio reproducing means in the controller reproduces audio in accordance with the reproduction control information through the use of the audio data.

According to the fortieth aspect of the present invention, audio data and reproduction control information indicating a reproduction method of the audio data are included in the function information, which makes it possible to specify in detail the reproduction method of the audio data in addition to simply presenting audio and provide the user with optimal audio information according to scene.

According to a forty-first aspect of the present invention, in the first aspect of the present invention, the device, when there occurs a change in the function information, notifies the controller through the transmission line that the change occurs.

According to the forty-first aspect of the present invention, when the status of the device changes, the change in the status is notified to the controller. This obviates the necessity for the controller to monitor the status of the device. Therefore, the traffic on the transmission line can be reduced, and the band of the transmission line can be effectively used, and moreover the load on the controller can be reduced.

According to a forty-second aspect of the present invention, in the second aspect of the present invention, the device comprises:

a storage means containing therein the function information;

a communication means for communicating with the controller through the transmission line; and a control means for sending the function information to the transmission line in response to the predetermined request received from the controller with the communication means, notifies, when there occurs a change in the function information, the controller with the communication means that the change occurs, and making the device operate in accordance with control information received from the controller with the communication means.

The equipment according to the forty-second aspect of the present invention can be used as second equipment including the device to be controlled in the network control system according to the forty-first aspect of the present invention.

According to a forty-third aspect of the present invention, in the third aspect of the present invention, the controller comprises:

a communication means for communicating with the device through the transmission line; and a control for acquiring the function information from the device by transmitting a predetermined request to the device with the communication means, and for controlling the device by receiving, when a notification that the function information changes is transmitted from the device, the notification with the communication means, and transmitting control information on the basis of the function information with the communication means according to the user's operation performed by means of the user interface.

The equipment according to the forty-third aspect of the present invention can be used as first equipment including the controller in the network control system according to the forty-first aspect of the present invention.

According to a forty-fourth aspect of the present invention, in the first aspect of the present invention, the device transmits, with there occurs a change in the function information, the changed information to the controller through the transmission line.

According to the forty-fourth aspect of the present invention, when there occurs a change in the internal status of the device connected to the transmission line, the device notifies the controller of the changed information. When receiving the notification, the controller can renew, for example, operational screen display in response to the changed information as required. Thus, the user can readily see the change in the status in the device connected to the transmission line.

According to a forty-fifth aspect of the present invention, in the second aspect of the present invention, the device comprises:

a storage means containing therein the function information;

a communication means for communicating with the controller through the transmission line; and a control means for sending the function information to the transmission line in response to the predetermined request received from the controller with the communication means, transmitting, when there occurs a change in the function information, the changed information to the controller with the communication means, and making the device operate in accordance with control information received from the controller with the communication means.

The equipment according to the forty-fifth aspect of the present invention can be used as second equipment including the device to be controlled in the network control system according to the forty-fourth aspect of the present invention.

According to a forty-sixth aspect of the present invention, in the third aspect of the present invention, the controller comprises:

a communication means for communicating with the device through the transmission line; and a control means for acquiring the function information form the device by transmitting a predetermined request to the device with the communication means, and for controlling the device by receiving, when changed information in the function information is transmitted from the device, the changed information to update the function information, and transmitting control information on the basis of the function information with the communication means according to the user's operation performed by means of the user interface.

The equipment according to the forty-sixth aspect of the present invention can be used as first equipment including the controller in the network control system according to the forty-fourth aspect of the present invention.

According to a forty-seventh aspect of the present invention, in the first aspect of the present invention, the device comprises storage means that has a non-rewritable area and rewritable area and contains therein the function information in the non-rewritable area and rewritable area.

According to the forty-seventh aspect of the present invention, a non-rewritable area and rewritable area are included in area in the device where the function information is stored. Thus, it is possible to provide not only information fixed to the device but also the information changing with time to the controller in a simple configuration. In this way, the changing information can be speedily provided to the user.

According to the forty-eighth aspect of the present invention, in the second aspect of the present invention, the device comprises:
  a storage means that has a non-rewritable area and rewritable area and contains therein the function information in the non-rewritable area and rewritable area;
  a communication means for communicating with the controller through the transmission line; and
  a control means for sending the function information to the transmission line with the communication means in response to the predetermined request received from the controller, and making the device operate in accordance with control information received from the controller with the communication means.

According to a forty-ninth aspect of the present invention, in the forty-seventh aspect of the present invention, the device notifies, when information in the function information and stored in the rewritable area changes, the controller that the information changes.

According to the forty-ninth aspect of the present invention, when the contents in the rewritable area change, the device notifies the controller that the contents in the rewritable area change, which obviates the necessity for the controller to monitor the information about the device. As a result, the traffic on the transmission line and the load on the controller can be reduced.

According to a fiftieth aspect of the present invention, in the forty-seventh aspect of the present invention, the storage means in the device stores a response to a request from the controller in the rewritable area among the area where the function information is stored.

According to the fiftieth aspect of the present invention, the device stores a response to the request from the controller in the rewritable area in the area where the function information of the device is stored. When there are a lot of responses, the device has only to write the responses in the rewritable area, and can omit the job such as splitting and transmitting the responses. As a result, the load on the device can be reduced.

According to the fifty-first aspect of the present invention, in the forty-seventh aspect of the present invention, the storage means in the device stores status information of the device in the rewritable area among the area where the function information is stored.

According to the fifty-first aspect of the present invention, status information of the device is stored in the rewritable area in the area where the function information of the device is stored, which obviates the necessity for the controller to issue various commands to confirm the status of the device. Therefore, it is possible to fetch entire information about the controller at a time, and reduce the load on the controller and traffic on the transmission line.

According to the fifty-second aspect of the present invention, in the forty-seventh aspect of the present invention, the storage means in the device stores a flag indicating whether elements forming the function information are stored in the rewritable area or in the non-rewritable area.

According to the fifty-second aspect of the present invention, a flag indicating whether the constituents (e.g. a directory) in the function information of the device are disposed in the rewritable area or in the non-rewritable area is provided. Accordingly, the controller can readily confirm whether information might be rewritten or not for each of its constituents. Then, the controller has only to check only the information that might be rewritten, which reduces the load on the controller.

According to a fifty-third aspect of the present invention, in the first aspect of the present invention, the function information includes information indicating contents reproducible by the device.

According to fifty-fourth aspect of the present invention, in the second aspect of the present invention, the device comprises:
  a storage means containing therein the function information including information indicating contents reproducible by the device;
  a communication means for communicating with the controller through the transmission line; and
  a control means for sending the function information to the transmission line in response to the predetermined request received from the controller with the communication means, and making the device operate in accordance with control information received from the controller with the communication means.

According to a fifty-fifth aspect of the present invention, in the third aspect of the present invention, the controller comprises:

According to a fifty-sixth aspect of the present invention, in the fifty-third aspect of the present invention, the device notifies, when the contents reproducible by the device changes, the controller through the transmission line that new contents becomes reproducible.

According to the fifty-sixth aspect of the present invention, when the contents reproducible by the device changes, the device notifies the controller that new contents becomes reproducible, which obviates the necessity for the controller to monitor the contents information. Therefore, the load on the controller can be reduced and the configuration can be simplified.

According to a fifty-seventh aspect of the present invention, in the fifty-third aspect of the present invention, the device transmits, when contents reproducible by the device change, information indicating the contents which becomes newly reproducible to the controller through the transmission line.

According to the fifty-seventh aspect of the present invention, when contents reproducible by the device change, the device transmits to the controller information indicating the contents which becomes newly reproducible, which obviates the necessity for the controller to monitor the contents information and fetch the contents information that might frequently change. Consequently, the load on the controller can be reduced and the configuration can be simplified.

According to a fifty-eighth aspect of the present invention, in the fifty-third aspect of the present invention, the device comprises storage means having a rewritable area and containing therein the function information, and the storage means stores in the rewritable area the information indicating the contents reproducible by the device at present.

According to the fifty-eighth aspect of the present invention, the device stores information about the contents reproducible at present in the rewritable area in the area in the device where the function information is stored. As a result, it is possible to readily and speedily fetch information which changes with time and the contents information to be a basis of the user's operation of equipment.

BRIEF DESCRIPTION OF THE DRAWINGS

FIG. 8 shows a structure of a function table which is an example of the function list in the network control system according to the first embodiment;

BEST MODE FOR CARRYING OUT THE INVENTION

The present invention is described in detail below with reference to accompanying drawings.

First Embodiment

Figure 1:
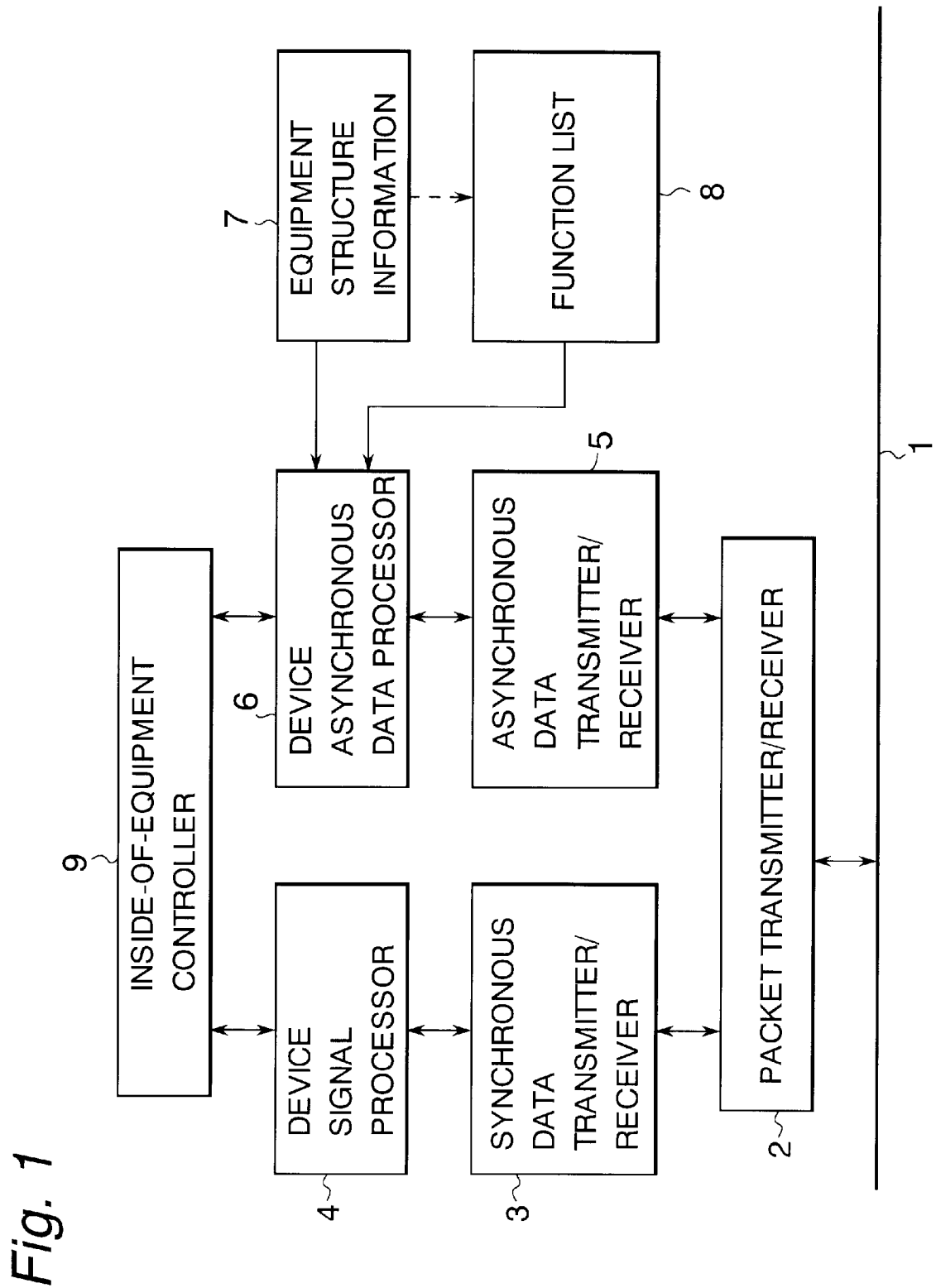
FIG. 1 is a block diagram showing a structure of a device in a network control system according to a first embodiment of the present invention.

FIG. 1 is a block diagram showing a device in a network control system according to a first embodiment of the present invention.

It should be noted here that a device in the present description refers to an object to be controlled, and a controller controls the object. A plurality of devices may be included in one piece of equipment, and both of the device and controller or either one of them may be included in one piece of equipment. Besides, one piece of equipment corresponds to one node on a transmission line. A plurality of nodes may be contained in one case to constitute an apparatus.

In FIG. 1, a reference numeral 1 stands for a transmission line, 2 for a packet transmitter/receiver, 3 for a synchronous data transmitter/receiver, 4 for a device signal processor, 5 for an asynchronous data transmitter/receiver, 6 for a device asynchronous data processor, 7 for equipment structure information, 8 for a function list, and 9 for an inside-of-equipment controller.

Here, the transmission line 1 is, for example, a serial bus (hereinafter, referred to as a "1394 bus") defined by the IEEE standard 1394 (the IEEE standard 1394-1995 and other higher level standards compatible therewith) The transmission line 1 is not necessarily the 1394 bus, and may be ATM (Asynchronous Transfer Mode), the Ethernet, and any other transmission lines.

The packet transmitter/receiver 2 physically and electrically interfaces to the transmission line 1, further arbitrates in bus-use rights, controls a synchronous transfer cycle, and so forth. Besides, the packet transmitter/receiver 2 selects a packet on the transmission line 1 according to a destination thereof to receive the packet, and transmits a packet onto the transmission line 1.

The synchronous data transmitter/receiver 3, when transmitting data, manages the transfer rates (splits the data) and adds a header to the data. For example, in the case where an AV protocol(IEC61883) standard of the 1394 bus is used, the synchronous data transmitter/receiver 3 adds a CIP (Common Isochronous Packet) header. On the other hand, when receiving data, the synchronous data transmitter/receiver 3 rearranges received packets in right order, removes a header from the data, and so forth.

The device signal processor 4 receives synchronous data from the synchronous data transmitter/receiver 3, and performs signal processing suited to the device. For example, in the case where the device is a recording player such as a digital VCR, the synchronous data is recorded into a storage medium (e.g. a magnetic tape). Moreover, the device signal processor 4 fetches synchronous data from a storage medium, a broadcast wave and the like, then transmits the data to the synchronous data transmitter/receiver 3, and so forth.

The asynchronous data transmitter/receiver 5 performs transaction processing on asynchronous data in accordance with a protocol of a bus. For example, in the case where the 1394 bus is used, the asynchronous data transmitter/receiver 5 performs processing of read transaction, write transaction, lock transaction and the like. Note that the asynchronous data transmitter/receiver 5 may be a software.

The device asynchronous data processor 6 processes asynchronous data received from the asynchronous data transmitter/receiver 5, or communicates the asynchronous data to an appropriate constituent in the device. For example, in the case of receiving a command as the asynchronous data, the device asynchronous data processor 6 judges the validity of the command, then provides the inside-of-equipment controller 9 with an instruction corresponding to the command when the command is valid. Besides, when the equipment structure information 7 is requested from the controller, the device asynchronous data processor 6 sends information included in the equipment structure information 7 to the controller through the asynchronous data transmitter/receiver 5 in response to the request received through the asynchronous data transmitter/receiver 5 and the like. The device asynchronous data processor 6 further sends asynchronous data received from a constituent in the device to the asynchronous data transmitter/receiver 5 based on an instruction from the inside-of-equipment controller 9. Note that the asynchronous data transmitter/receiver 5 and the device asynchronous data processor 6 may be constituted as one unit.

The equipment structure information 7 indicates information about a structure of the equipment, and is described, for example, under a rule specified by a configuration ROM in a CSR (Command and Status Registers) architecture of the ISO/IEC standard 13213:1994. When the 1394 bus is employed, the equipment structure information 7 has information about a bus corresponding to the equipment such as whether the equipment supports a bus manager and Isochronous operation, a unit directory including information about whether the equipment supports an AV protocol, a node ID which is an identifier of the equipment, and the like. In the equipment structure information 7, information indicating a location of the function list 8 is described.

The function list 8 is a list of functions of the equipment, and is stored in predetermined memory thereof as a function table in the form of a table, for example. The function list 8 has a function of the equipment, one or a plurality of commands corresponding to the function, and GUI (Graphical User Interface) information for notifying the user of the function and indicating the status of the equipment when the user selects the function. Here, the commands are included in the function list 8 in the form where they can be interpreted and executed by the equipment, and are equal to control codes which have a broader concept than normal commands. That is, the commands are equivalent of control codes indicated by various identifiers peculiarly specified for the equipment as well as control commands such as standardized commands and command speculiar to the equipment. The information of the function list 8 is transferred to the controller on the transmission line 1 through the device asynchronous data processor 6, the asynchronous data transmitter/receiver 5 and the like in response to a request from the controller.

The inside-of-equipment controller 9 controls each of its constituents including the inner workings of the device and the like. In the case where the device asynchronous data processor 6 receives a command as data, the inside-of-equipment controller 9 controls the constituents based on an instruction from the device asynchronous data processor 6 so that the constituents operate in accordance with the command. For example, in the case where the device is a VCR, and the received command is a PLAY command, the inside-of-equipment controller 9 sequentially instructs the VCR to perform operation such as rotating a drum of the VCR at the predetermined number of revolutions, moving a tape at a given speed, fetching a signal from a head on the drum to send the signal to the device signal processor 4, and the like.

Operation of the device in response to a request and the like from the controller is described as follows: When the function list 8 is requested from the controller, the device presents the function list 8 to the controller. When a command from the controller is received, the device performs processing for the command according to the circumstances. Thus, the device has only to present the function list 8 in response to the request for GUI information from the controller, thereby making it possible to decrease the load on the device.

It should be noted that the constituents such as the synchronous data transmitter/receiver 3, the device signal processor 4 and the like may be operationally included depending on the functions of the device, or may be omitted.

Moreover, the equipment structure information 7 and the function list 8 of the device are generally disposed in a non-rewritable memory area, however, they may be disposed in a rewritable memory area such as a flash ROM.

Furthermore, each part of the device may be formed by either of hardware or software.

Figure 2:
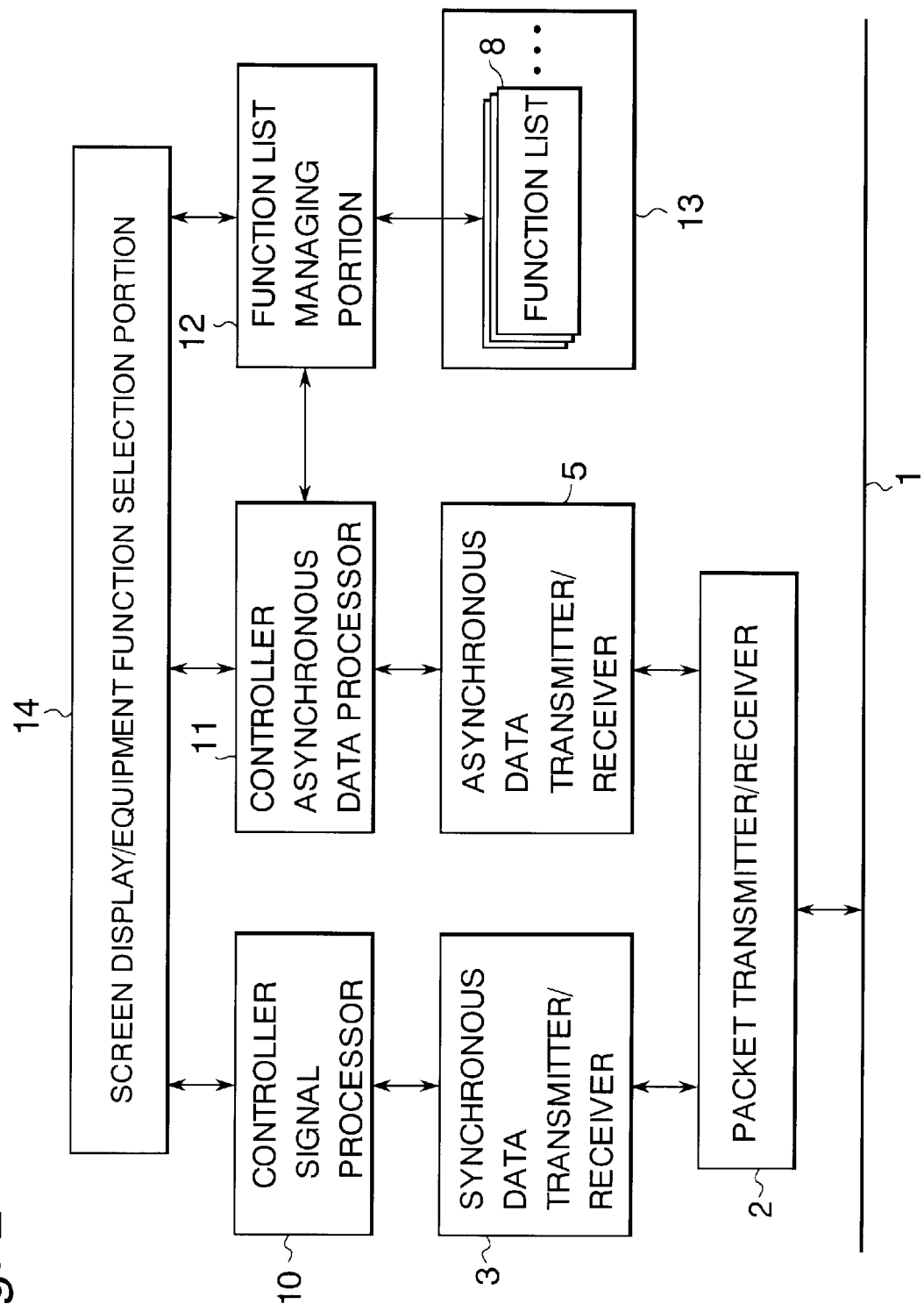
FIG. 2 is a block diagram showing a structure of a controller in the network control system according to the first embodiment.

FIG. 2 is a block diagram showing the controller in the network control system according to the present embodiment. Here, reference numerals 10 to 14 represent a controller signal processor, a controller asynchronous data processor, a function list managing portion, a function database, and a screen display/equipment function selection portion, respectively. Note that in FIG. 2, the same constituents as those in FIG. 1 are assigned the same numerals, and the description thereof is omitted here.

The controller signal processor 10 receives synchronous data from the synchronous data transmitter/receiver 3 to perform signal processing suitable for the controller. For example, in the case where the controller is a video display such as a video monitor, the controller signal processor 10 decodes the synchronous data (e.g. a stream of MPEG2) and displays the data on the screen.

The controller asynchronous data processor 11 processes asynchronous data received from the asynchronous data transmitter/receiver 5, or communicates the data to an appropriate constituent of the controller. In the case where the received asynchronous data is a command, the controller asynchronous data processor 11 judges the validity of the command, and when the command is valid, provides the screen display/equipment function selection portion 14 with an instruction corresponding to the command. Besides, the controller asynchronous data processor 11 receives from the packet transmitter/receiver 2 via the asynchronous data transmitter/receiver 5 information about devices on the transmission line 1 such as connection of a new device, disconnection of an existing device and the like and the function list 8 of each device, and communicates them to the function list managing portion 12. Furthermore, the controller asynchronous data processor 11 sends asynchronous data from the constituent of the device to the asynchronous data transmitter/receiver 5 based on an instruction from the screen display/equipment function selection portion 14. Note that the asynchronous data transmitter/receiver 5 and the controller asynchronous data processor 11 may be constituted as one unit.

Moreover, in the case where the controller and the device are included in the same equipment, the functions of the device in the equipment are listed in the function list 8 of the device, but not registered in the function database 13 in the equipment since the controller grasps the functions of the device, or the inside-of-equipment controller 9 directly controls the inside of the equipment. At this time, it is obvious that the location of the function list 8 may be described in the equipment structure information 7 and also previously registered in the function database 13.

It should be noted that in the case where the controller and the device are included in the same equipment, the controller signal processor 10 and the device signal processor 4, and the controller asynchronous data processor 11 and the device asynchronous data processor 6 may be respectively constituted as the same unit.

The function list managing portion 12 manages information of the function list 8 received from the device on the transmission line 1. When the controller asynchronous data processor 11 receives information indicating that a new device is connected, the function list managing portion 12 instructs the controller asynchronous data processor 11 to read the function list 8 of the new device. Then, when the function list 8 of the new device is read, the function list managing portion 12 registers the information of the function list 8 in the function database 13. Moreover, when information is received indicating, for example, that an existing device on the transmission line 1 is disconnected, the function list managing portion 12 deletes the corresponding function list 8 from the function database 13. When an existing device is disconnected, it may be also possible that the information of its function list 8 is saved in a storage (not shown in the drawing) in the controller instead of being deleted, and thereby, when the device is connected again, the device is identified with the identifier of the device and the like, and then the information of the function list 8 is read from the storage in the controller and registered in the function 13. In this way, registration of the connected devices can be expedited.

The function database 13 is disposed in a rewritable memory space, and contructed through the use of the function list 8 received from the device as a database. The database is consulted using the information in the function list managing portion 12, thereby making it possible to fetch information about each device and function and command corresponding to the function and the GUI information for notifying the user of the function and representing the status of the equipment when the user selects the function.

The screen display/equipment function selection portion 14 notifies the user of the GUI information about the device and function and the like by means of video/audio/character information and the like representing the GUI information displayed on the screen of the controller, selects a device and function in accordance with the user's operation, makes an instruction for execution of each function, and so forth. Besides, the screen display/equipment function selection portion 14 can reproduce/display data (e.g. video and audio data) received from the controller signal processor 10 and data received from the controller asynchronous data processor 11. At this time, the GUI information and the like, when displayed, may overlay the video data received from the controller signal processor 10. Alternatively, screen display for the GUI information and screen display for the video data may be alternately switched based on the user's instruction and the like.

Furthermore, in the case that the screen display/equipment function selection portion 14 provides an instruction to the function list managing portion 12 to retrieve the information of the function list 8, thereby displaying on the screen graphics representing the device on the transmission line 1 and the function thereof (a device name, a function name, a still picture sequence for display and the like). Then, when the user selects graphics representing a function, the screen display/equipment function selection portion 14 replaces the graphics with graphics for a selected occasion obtained from the information of the function list 8 to display the same, and indicates to the user that the function is selected by reproducing audio data for a selected occasion, whereby the user's operation can be supported. Then the screen display/equipment function selection portion 14 issues a command corresponding to the function obtained from the information of the function list 8 through the controller asynchronous data processor 11 and the like. The screen display/equipment function selection portion 14 receives via the controller asynchronous data processor 11 a response from the device to the command and a status of the device to which the instruction is made, then obtains graphics data and audio data suitable for the status of the device and the like from the information of the function list 8, and displays graphics on the screen or reproduces audio to notify the user.

Here, it is not always necessary for the controller to understand each function of the device. For example, as to a device having a new function not conceivable at present, the controller fetches graphics data and audio data for the new function from the information of the function list 8 and thereby displays graphics on the screen or reproduces audio, to notify the user. Then, when the user understands the new function from the graphics or audio and selects the function, the screen display/equipment function selection portion 14 in the controller refers to the function list 8, then obtains a command corresponding to the new function, and issues the command to the device. As a result, it is possible to execute the new function in the device. Thus, the above structure enables the user to perform a new function not conceivable at present.

It should be noted that the constituents such as the synchronous data transmitter/receiver 3 and the controller signal processor 10 may optionally be included according to the function of the controller, or may be omitted.

Figure 3:
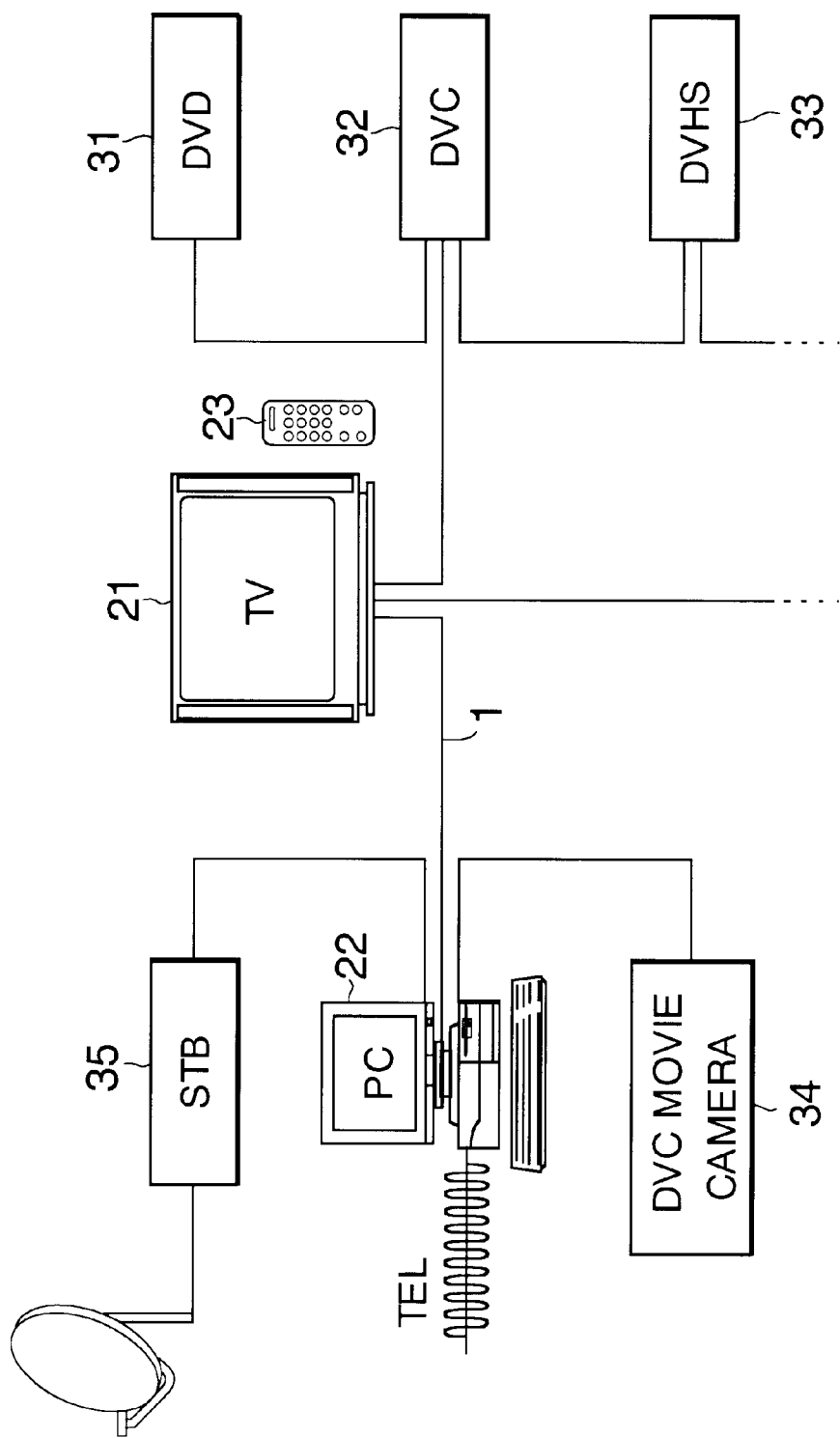
FIG. 3 shows an exemplary configuration of the network control system according to the first embodiment.

FIG. 3 shows the system configuration of the network control system of the present embodiment.

In FIG. 3, a reference numeral 21 stands for a television set (TV), 23 for a remote controller for the television set, 22 for a personal computer (PC), 31 for a DVD-format optical disk capable of recording and reproducing (DVD), 32 for a DV digital VCR (DVC), 33 for a VHS digital VCR (DVHS), 34 for a DV digital movie camera (DVC movie), and 35 for a set-top box (STB) for CS digital broadcast and the like. The above-described equipment is collectively referred to as video/audio/information equipment. The video/audio/information equipment is interconnected with the transmission line 1 to constitute an AVC system. The video/audio/information equipment should not be limited to the above equipment and includes currently-used equipment (e.g. a printer, a mini-disk and the like) and all equipment to come in the future in each of video, audio and information fields.

The television set 21 is constituted by a controller and a device (a terrestrial broadcasting wave tuner and a video monitor). The user provides an instruction to the screen display/equipment function selection portion 14 in the television set 21 with the remote controller 23. The PC 22 is constituted by a controller and a device (a modem interfacing with a telephone line, a video monitor and the like). The user provides an instruction to the screen display/equipment function selection portion 14 in the PC 22 with a keyboard, a mouse and the like. The television set 21 and the PC 22 are defined here as equipment in which the devices and controllers are combined in one. Among the functions of each device in the equipment, a function which can be used by other equipment is described in the function list 8. A function of the equipment, however, is not registered in the function database 13 in the controller in the equipment. Note that the television set 21 and PC 22 may be defined as equipment constituted by two devices and a controller and have the function list 8, for each device in the equipment, which is registered in the function database 13 in the controller in the equipment.

The DVD 31 and DVC movie camera 34 are devices capable of recording and reproducing AV data. The DVC 32 and DVHS 33 are equipment each consisted of a device capable of recording and reproducing AV data and a device having the function of a digital broadcast tuner. The STB 35 is a device having the function of a tuner for receiving CS digital broadcast.

While the DVD 31, DVC 32, DVHS 33, DVC movie camera 34 and STB 35 are defined as devices here, they may be defined as equipment including controllers and devices regardless of the size if they can realize an environment for operating other devices on a liquid crystal panel and the like thereof and a user can perform operation such as selecting a function of other devices by means of a touch panel, a remote controller and the like thereof. Alternatively, it is also possible that each equipment has a processing function as a controller and a remote controller for itself, and lets a monitor display images and reproduce audio by means of analog connection, to enable the user to operate the equipment by manipulating the remote controller while viewing a screen of the monitor. In this case, the equipment may be identified as equipment including a controller and a device.

Figure 4:
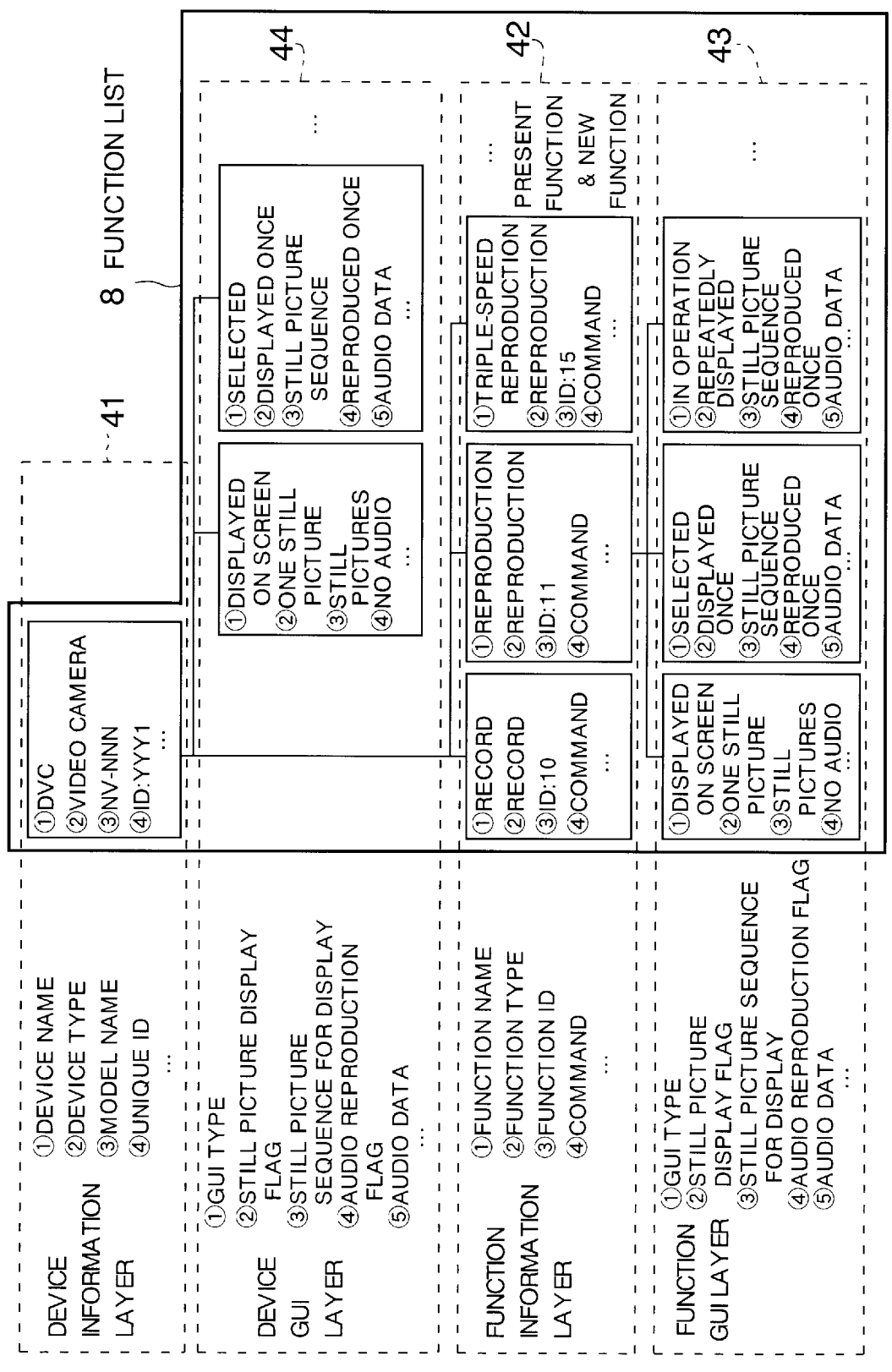
FIG. 4 illustrates an exemplary function list in the network control system according to the first embodiment.

FIG. 4 illustrates the function list 8 according to the present embodiment.

In FIG. 4, reference numerals 41 to 44 represent a device information layer, a function information layer, a function GUI information layer, a device GUI layer, respectively. The function list 8 has a tree structure with nodes of directories or leaves described later.

The function list 8 is mainly composed of two layers of the device information layer 41 and the function information layer 42, and the device GUI layer 44 and the function GUI layer 43 are further added to the device information layer 41 and the function information layer 42, respectively. First, the device information layer 41 shows information about a device, that is, formed by attribute information including device identification information, specifically, a device name expressing a generic name for the device in a character string, a device type expressing a type of the device in a code, a model name expressing a model of the product specified by a manufacturer in a character string, a unique ID representing the device and varying with device, and the like. Here, the device name may be expressed in a code, the device type may be a code or a character string expressed by subunit_type of AV/C Digital Interface Command Set (AV/C-CTS) discussed by the 1394 TA (1394 Trade Association), and the unique ID may be node_vendor_id or chip_id defined by the 1394 bus.

Note that the device information layer 41 has even information about the function list 8, and describes therein a support level of the function list 8, a table size in case of realizing the function list 8 in a table form, a maximum transfer amount which the device can transmit in one asynchronous transfer, and the like. The controller can thus decide, merely by looking at this layer before reading the entire function list 8, whether or not the controller can support the level of the function list 8, how much of the memory space the controller must reserve for the function list 8, what amount the controller should transfer, for example. This makes it possible to eliminate unnecessary transfer.

Figure 5:
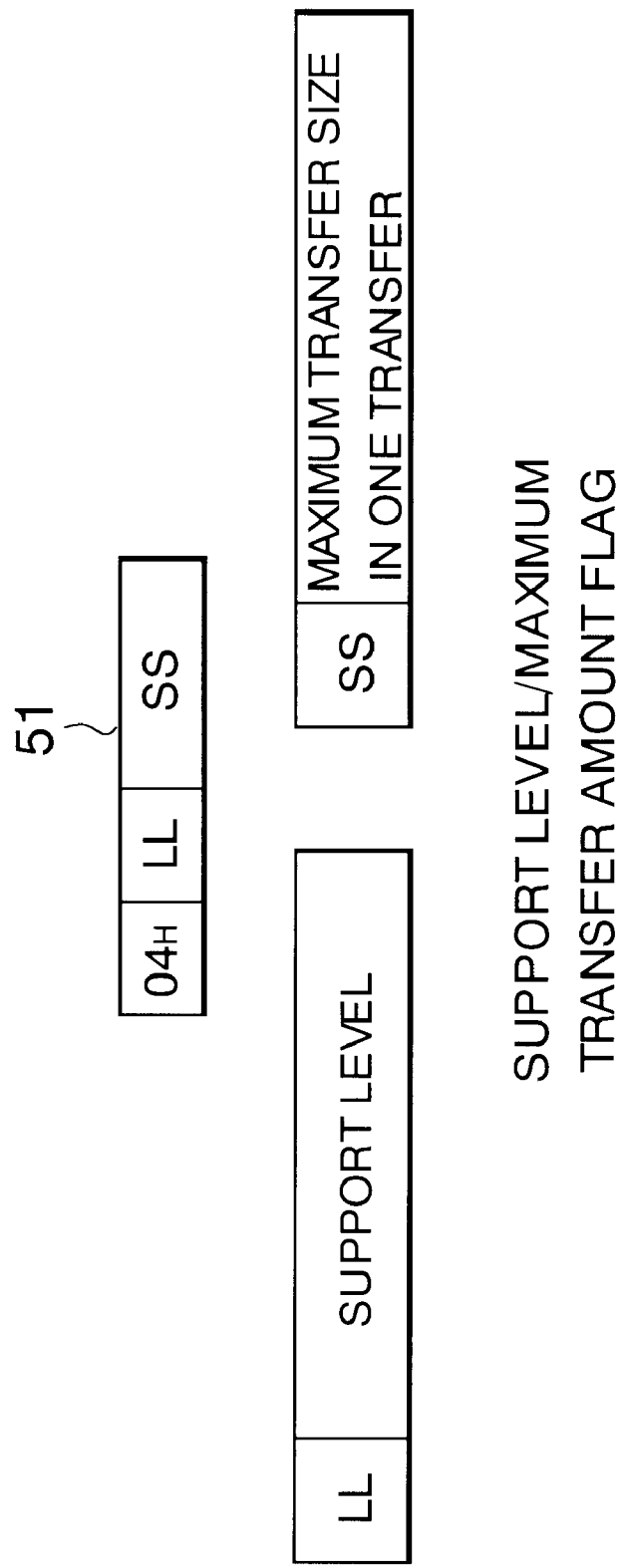
FIG. 5 shows an exemplary structure of a support level/maximum transfer amount flag in the function list in the network control system according to the first embodiment.

FIG. 5 is a block diagram showing an exemplary support level/maximum transfer amount flag. Here, a reference numeral 51 stands for a support level/maximum transfer amount flag. In the support level/maximum transfer amount flag 51, the first one byte(04H in FIG. 5; Hmeans hexadecimal notation) is an identifier indicating the support level/maximum transfer amount flag 51. The next one byte "LL" expresses in a code the level which the function list 8 supports. The level here is obtained by classification, for example, according to the information included in the function list 8, and is determined based on whether or not a plurality of still pictures are included in the GUI information, whether or not audio data is included therein, and whether an execution code executable by the controller is included therein. The last two bytes "SS" represent a maximum transfer size that the device having the function list 8 can transmit in one transfer, and are expressed by hexadecimal bytes denoting the maximum transfer amount. The maximum transfer size which can be transmitted in one transfer of course expressed in a code.

Next, the function information layer 42 indicates the functions of the device, and is formed, for each function that the device supports, by a function name expressing the function in a character string, a function type expressing a type of the function in a code, a function ID for identifying each function, one or a plurality of commands corresponding to the function, and the like. Here, the function type may be a character string. In example of the DVC, the DVC has the functions such as reproduction, record, stop, fast-forward, fast-reverse, still, triple-speed reproduction and the like, and creates a directory for each function. In the directory, a function name, a function type, a function ID, a command and the like are described. The function type includes, for example, reproduction, record, tape operation and the like. The command includes one or a plurality of combinations of a command defined by the AV/C-CTS, a vendor's unique command and the like, for example. The function ID is an identifier having individual numbers varying with function in the device. It is obvious that the function ID may be differently assigned to devices having the same function type, whereby each function can be identified with the function type and the function ID. It should be noted here that even in a device having a new function not conceivable at present, a directory for the new function is created in the function information layer 42.

The function GUI layer 43 indicates user interface information about each function. In the function GUI layer 43, the directories for individual functions obtained by classification in the function information layer 42 are further classified according to user's operation and the status of the device. A directory is then created for each category resulting from the classification, which includes therein a GUI type expressing a GUI type in a code, a still picture display flag, a still picture sequence for display composed of one or a plurality of still pictures, an audio reproduction flag, audio data and the like. Here, the GUI type includes, for example, "displayed on screen" used when the function is displayed on the screen of the controller, "selected" used when the function is selected on the controller screen, "executed" used during the function is being executed by the device, "error" used when the device does not accept a command corresponding to the function from the controller, and the like. Besides, in the case where a new function happens to be a function not conceivable at present, it is possible to provide the user with information about the new function by disposing a still picture and audio data representing the new function in the function GUI layer 43 to transmit the data of the new function to the controller.

Figure 6:
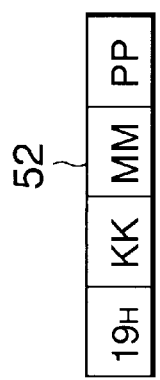
FIG. 6 shows an exemplary structure of a still picture display flag in the function list in the network control system according to the first embodiment.

FIG. 6 is a block diagram showing an exemplary still picture display flag as display control information for reproducing a still picture. Here, a reference numeral 52 is a still picture display flag. In the still picture display flag 52, the first one byte (19H in FIG. 6) is an identifier indicating the still picture display flag 52, and the next one byte "KK" indicates the number and the presence or absense of still pictures. The next one byte "MM" indicates a method of displaying the still picture sequence for display, and expresses in a code, for example, whether the still picture sequence for display is displayed in only one cycle or repeatedly, or only the first still picture is displayed, and the like. The last one byte "PP" indicates a display interval between still pictures of the still picture sequence for display. The last one byte "PP" is expressed, by example, by multiples of 30 (msec) and only the multiple part is described. Therefore, in the case where a plurality of still pictures in the still picture sequence for display are displayed, the still pictures are sequentially switched at the display interval to be displayed on the screen of the controller as quais-motion pictures.

Figure 7:
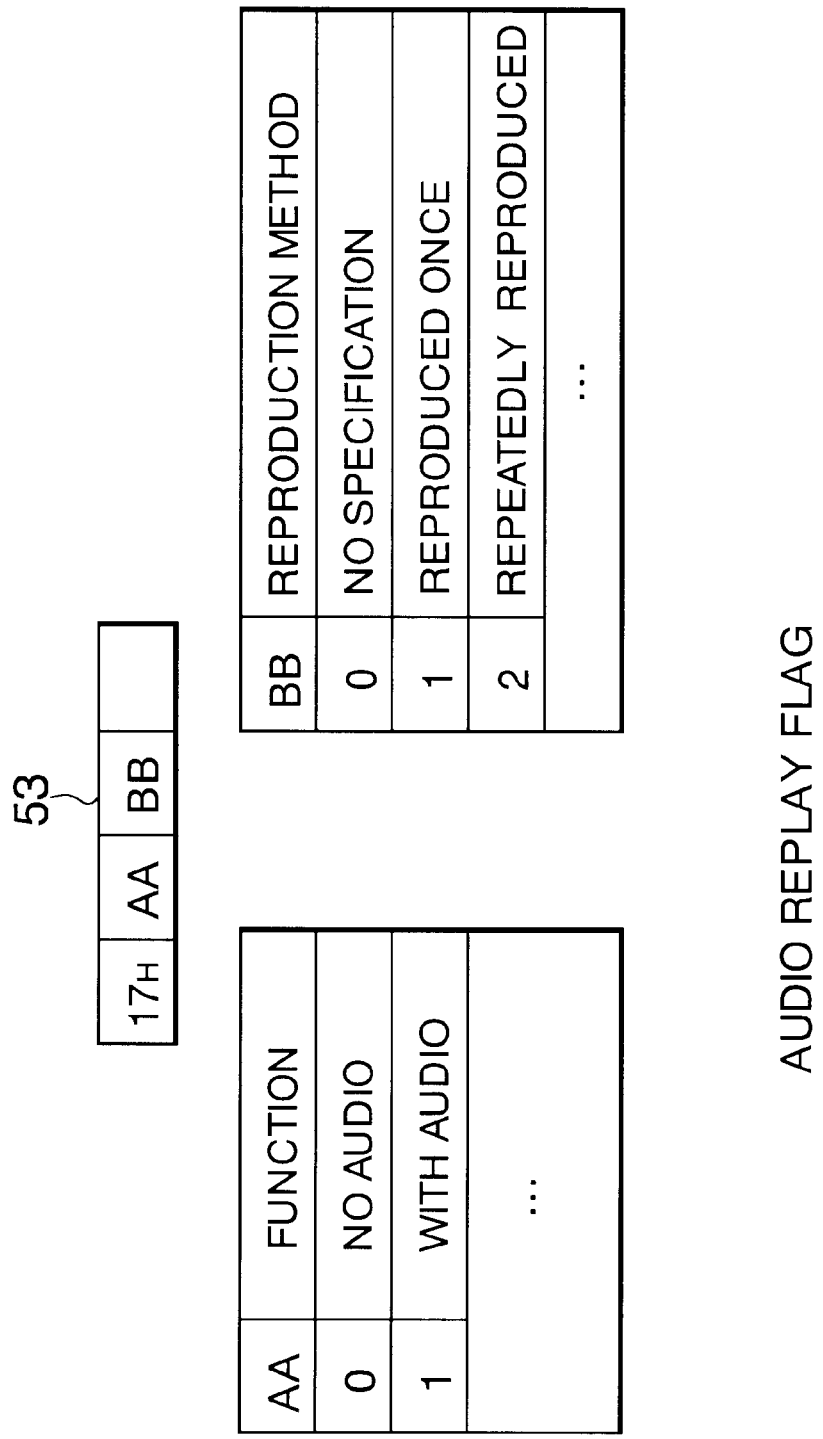
FIG. 7 shows an exemplary structure of an audio reproduction flag in the function list in the network control system according to the first embodiment.

FIG. 7 is a block diagram showing an exemplary audio reproduction flag as reproduction control information for reproducing audio. Here, a reference numeral 53 is an audio reproduction flag. In the audio reproduction flag 53, the first one byte (17H in FIG. 7) is an identifier indicating the audio reproduction flag 53, and the next one byte "AA" indicates the presence or absence of audio data. The next one byte "BB" indicates a method of reproducing audio data, and expresses in a code, for example, whether audio data is reproduced only once or repeatedly. It is also possible to specify a reproduction interval of audio data in the audio reproduction flag 53 for prompting user's operation.

In FIGS. 5 to 7, the identifier of each flag is described in accordance with the CSR architecture of the ISO/IEC 13213:1994 standard, and as the first two bits of the identifier of each flag, keytype of the CSR architecture is used.

The device GUI layer 44 is a hierarchy indicating user interface information of the device, and is classified according the user's operation and the status of the device. Each category resulting form the classification has a GUI type expressing a type of GUI in a code, the still picture display flag 52, a still picture sequence for display composed of one or a plurality of still pictures, the audio reproduction flag 53, audio data and the like. The GUI type here includes, for example, "displayed on screen" used when the device is displayed on the screen of the controller, "selected" used when the device is selected on the controller screen, "in operation" used when the device is in operation, "in use" used when the device is used by another controller, "error" used when the device does not accept an instruction from the controller, and the like.

FIG. 8 is a diagram showing a function table which is an example of the function list 8 in the present embodiment. In FIG. 8, an address space in memory is expressed by a portrait format rectangle, and 4 bytes wide. The "Length" in the drawing expresses a size of contents of a directory or leaf equivalent of individual nodes forming a tree structure of the function list 8 as multiples of 4 bytes, and "CRC" is cyclic redundancy check bits. Note that the addresses here are assigned for convenience in explanation and therefore can be arranged arbitrarily, or the constituents may be respectively identified with identifiers.

The directory beginning with "Address=430H", for example, is equivalent of a unit directory of the CSR architecture, and defines therein a function table entry indicating a location of the function list 8 (Address=440H). Information in an area from Address=430H to 440H is included in the equipment structure information 7.

The information of the function list 8 is described in Address=800H and thereafter. The device information layer 41 is disposed in an area from Address=800H to an address just before Address=900H, the function information layer 42 in an area from Address=900H to an address just before Address=A00H, and the function GUI layer 43 in an area from Address=A00H and thereafter.

In FIG. 8, each of the function table entry, the device name entry and the like has an identifier for identifying an entry type thereof in the first one byte, and indicates a relative address value to each directory or leaf in the remaining three bytes. Note that key_type of the CSR architecture is used as the first two bits of the identifier.

In this way, the directory structure reserving a variable area for each category such as a function, GUI and the like and for each constituent is constructed. This makes it possible to effectively use a memory area storing the function list 8 and readily retrieve each category and constituent.

While an area from Address=800H to an address just before Address=900H is defined as the device information layer 41 here, some of information included in the device information layer 41 may be described in a part of the equipment structure information 7, and in this case, the device information layer 41 is formed by a plurality of directories. Similarly, the other layers may be respectively formed by a plurality of directories if the relation between layers is clear.

Figure 9:
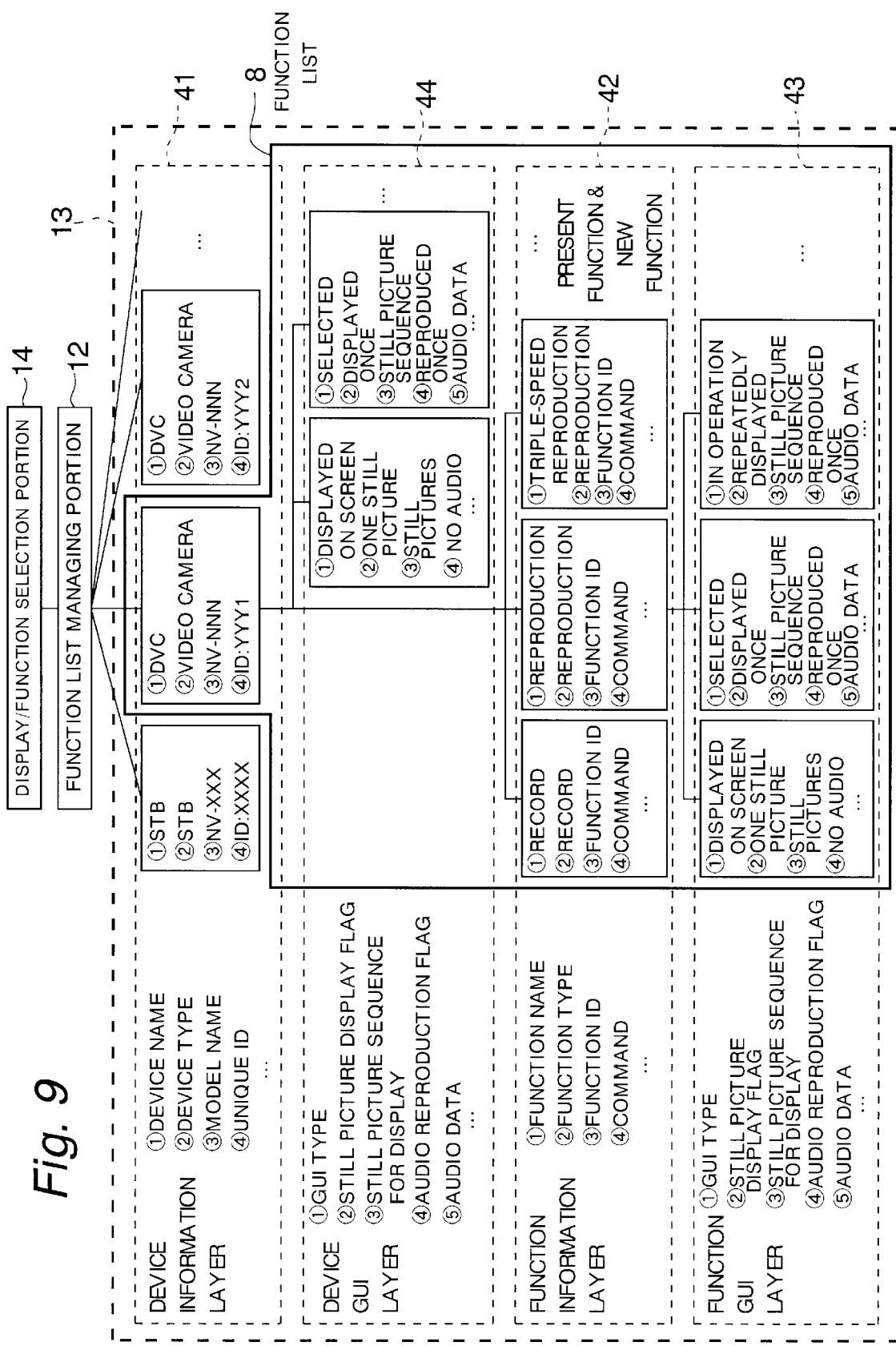
FIG. 9 illustrates a function database in the network control system according to the first embodiment.

FIG. 9 illustrates the function database in the first embodiment. Referring to FIG. 9, the operation of the controller is described.

In FIG. 9, when a device is connected to the transmission line 1, a controller on the transmission line recognizes the new device by means of bus reset and the like in the case of the 1394 bus, for example, then reads the function list 8 from the new device through the transmission line 1 according to an instruction from the function list managing portion 12, and copies and registers the function list 8 into the function database 13 in the controller. Here, the function list 8 is identified with a memory address in which the function list 8 is disposed, the unique ID and the like, and has a directory structure having an entry for each device.

The screen display/equipment function selection portion 14 refers to information of the function list 8 in the function database 13 through the function list managing portion 12. When the screen display/equipment function selection portion 14 displays a list of devices connected to the controller according to an instruction such as the user's operation of the remote controller, the screen display/equipment function selection portion 14 reads the device name and device type in the device information layer 41, the still picture sequence for display in the device GUI layer 44, and the like from the function lists 8 of all devices registered in the function database 13 through the use of information in the function list managing portion 12, and displays the same on the screen. Here, the devices are identified with the memory addresses in which their function lists 8 are disposed, their unique IDs and the like. All information in the device information layer 41 is not necessarily displayed on the screen, of course, and may be appropriately selected and displayed. Besides, according to the usage condition of each equipment, the still picture sequence for display and the like for the used occasion may be read from the device GUI layer 44 and displayed on the screen, thereby providing a more user-friendly device list. Here, the audio data in the "displayed on screen" category in the device GUI layer 44 is not used in displaying the device list. For example, when a new device is connected while the device list is displayed, the still picture sequence for display of the new device is displayed and the audio data in the "displayed on screen" category is reproduced.

Next, in the case that the user selects, for example, the DVC having the unique ID "YYY1" with a pointing function (e.g. a cross key) of the remote controller 23 and the like, the screen display/equipment function selection portion 14 reads the still picture sequence for display for the selected occasion and the like in the device GUI layer 44, and displays the same on the screen in accordance with the still picture display flag 52. Then, the screen display/equipment function selection portion 14 reads the still picture sequence for display in the function GUI layer 43 for each function described in the function information layer 42 from the function list 8 of the device with using the function list managing portion 12, and displays the same on the screen based on an instruction of the still picture display flag 52. Graphics representing all functions of the device is thus displayed on the screen. Here, the respective functions are identified with the function ID in the function information layer 42 and the memory addresses in which the function information is disposed, and the types of GUI are identified with the GUI type and the memory addresses in which the various types of GUI information are disposed. Of course, it is also possible to define IDs for GUI and then uniquely assign the numbers to the various types of GUI to manage the types. This facilitates the management and enables a plurality of functions to share a GUI, whereby memory in the equipment can be reduced. Here, since each function has screen display data, it is possible to flexibly cope with the case where the enough space for displaying the screen display data of all functions can not be reserved due to constraints such as relation with other display items and resolution of the screen, by displaying only the function names but not the graphics as for some functions, changing the layout relation among the graphics of functions, and so forth.

Furthermore, in the case where the user moves a cursor onto the graphics representing a reproduction function of the device, for example, by means of the pointing function of the remote controller, the screen display/equipment function selection portion 14 fetches audio data in the "displayed on screen" category in the function GUI layer 43 whose function information layer is for reproduction from the function list 8 of the device while using the function list managing portion 12 again, reproduces the audio data based on the instruction of the audio reproduction flag 53. The audio data may be audio for explaining the function, some melody, or audio indicating a selection method, for example. Here, in the case where the user moves the cursor onto the graphics representing the reproduction function, the screen display/ equipment function selection portion 14 reproduces audio data not immediately but only when the cursor has been still located on this position even after a lapse of time (e.g. almost a second) required to predict that the user's intention is directed to the function.

Next, in the case where the user selects the graphics representing the reproduction function of the device, for example, by means of the pointing function of the remote controller and the like, the screen display/equipment function selection portion 14 fetches one or a plurality of commands corresponding to the function from the function list 8 of the device, and sequentially transmits the commands to the device. The command here is a command indicating a function, function ID of the function, identifier of the graphics, or the like. The screen display/equipment function selection portion 14 then monitors the status of the device, and when an operation mode of the device becomes a desired operation mode (here, the reproduction status), displays a reproduced picture from the device on the screen. At the same time, the screen display/equipment function selection portion 14 fetches the selected still picture sequence for display and audio data for the selected occasion in the function GUI layer 43 whose function information layer 42 is for reproduction function, then displays the still picture string for display over the graphics representing the reproducing function in the manner indicated by the still picture display flag 52, and replays the audio data based on the instruction of the audio reproduction flag 53. The audio data may be audio for explaining the operation of the function and the state of the device, or some melody. While the status of the device is monitored here, when the status of the device changes, the device asynchronous data processor 6 and the inside-of-equipment controller 9 in the device may notify the change in the status to the controller which transmits a command causing the change. In this case, the controller does not have to monitor the status of the device, thereby reducing the traffic on the transmission line 1. Consequently, the band of the transmission line 1 can be effectively used and the load on the controller can be reduced.

Moreover, in the case where the device can not accept the command transmitted by the controller for some reason, the screen display/equipment function selection portion 14 senses that the device does not accept the command based on the response to the transmitted command, the result of the monitoring of the device status and the like. The screen display/equipment function selection portion 14 then fetches the still picture sequence for display and audio data for the error occasion in the function GUI layer 43 whose function information layer 42 is for reproduction function, then displays the still picture sequence for display over the position of the graphics representing the reproduction function in the manner indicated by the still picture display flag 52, and at the same time, reproduces audio data based on the instruction of the audio reproduction flag 53. The audio data may be sound for explaining the status of the device, some beep tones, or some melody, for example. While the still picture sequence for display for the error occasion is displayed over the position of the graphics representing the reproduction function here, it may be widely displayed in a conspicuous position such as a center of the screen.

All screen display data and audio data as for each device and function is transferred from the device in the present invention. However, in the case where varying screen display data is received from a plurality of DVCS, for example, as for a common function among the DVCs, screen display data for the function existing in the function list 8 of any one of the DVCs may be used, and as for a function unique to a DVC, screen display data in the DVC may be used. Moreover, the controller may previously have screen display data for a general function therein, to use the screen display data for the general function . While the description was made with an example of screen display data here, audio data may be of course used similarly. In this way, screen display data for a function and device is shared among some devices, which makes it possible to keep consistency of screen display provided by the controller and display at the time of operation.

Furthermore, while the screen display/equipment function selection portion 14 performs its display and reproduction operation in accordance with the still picture display flag 52 and audio reproduction flag 53 here, the screen display/ equipment function selection portion 14 may specify display and reproduction methods by itself in advance, or determine display and reproduction methods with reference to the still picture display flag 52 and audio reproduction flag 53. The screen display/equipment function selection portion 14 thus determines displaying/reproduction methods, thereby keeping consistency of the operational environment.

It should be noted that one or some of the device information layer 41, the function information layer 42, the function GUI layer 43, and the device GUI layer 44 may be omitted according to the ability and function and the like of the equipment as required.

Figure 16:
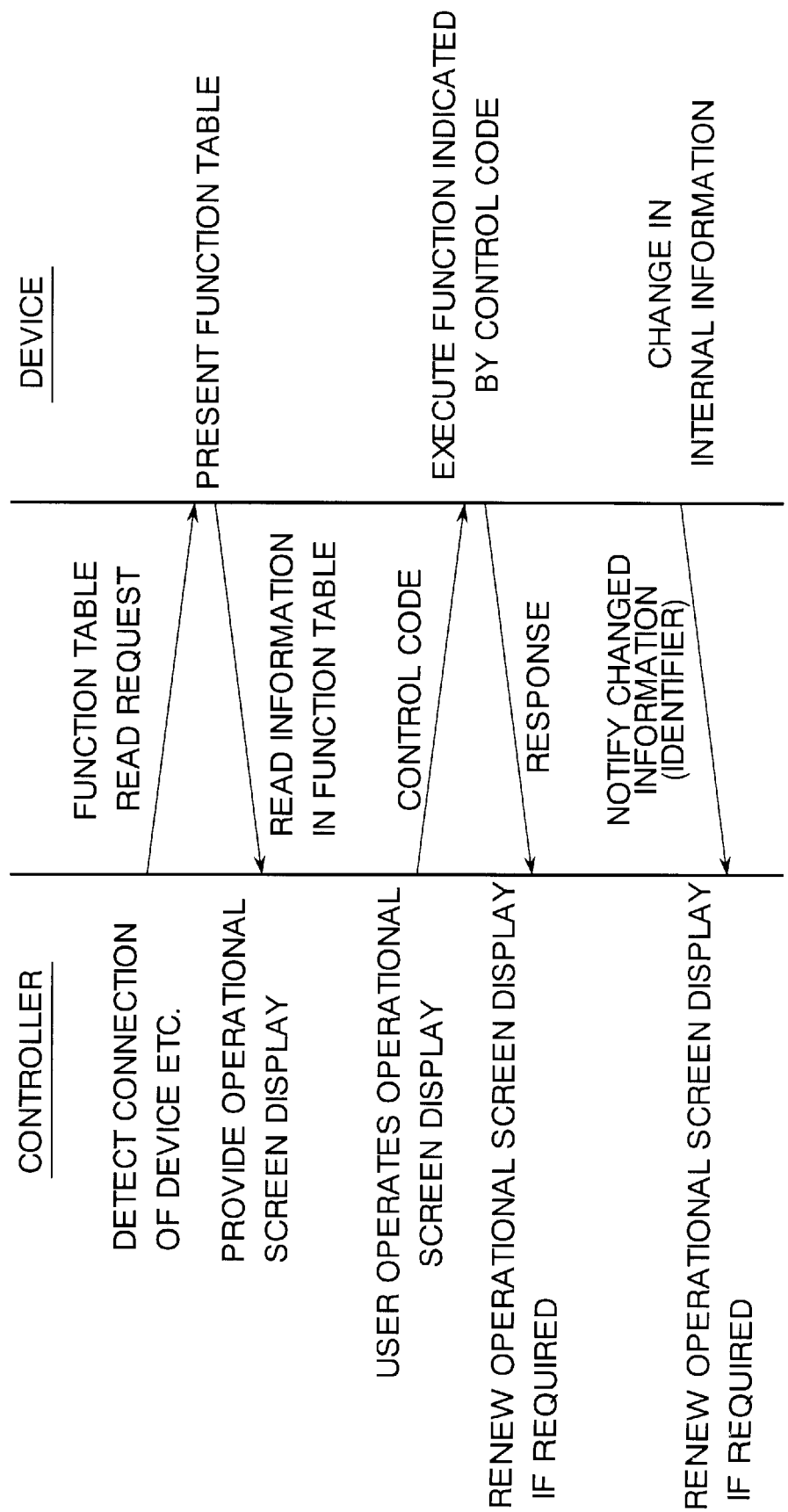
FIG. 16 shows exemplary operation in the network control system according to the first embodiment of the present invention.

FIG. 16 shows an exemplary operation in the network control system in the present embodiment.

In the network control system in the present embodiment, when a device is newly connected to the transmission line 1, the controller 1 recognizes the new device, for example, by means of bus reset and the like in the case of the 1394 bus, and transmits a function list read request through the transmission line 1 to the new device. In response to the request, in the new device, the device asynchronous data processor 6 receives the request via the asynchronous data transmitter/receiver 5 and the like, and transmits the information of the function list 8 via the asynchronous data transmitter/receiver 5 and the like to the controller. Note that the controller may read the function list 8 from the device through the transmission line together with the function list read request.

The controller thus acquires the information of the function list 8 from the new device, then copies and registers the information of the function list 8 to/in the function database 13. After the information of the function list 8 is registered, the screen display/device function selector 14 of the controller displays the operational screen display through the use of the GUI information corresponding to the new device, the GUI information of the function and the like. Thus, the graphics representing the new device and the function thereof is displayed on the screen in addition to the graphics representing the devices already registered in the function list 8 and the functions thereof.

The user operates with respect to the operational screen display in the controller obtained in the above manner to select a function of a predetermined device provided on the operational screen display, whereby a control code corresponding to the function is issued to the selected device. That is, the screen display/device function selector 14 retrieves a control code corresponding to the graphics and the like manipulated by the user from the function database, and transmits the control code, instructing the device to execute the function represented by the graphics, to the selected device. The device which receives the control code interprets and executes the instruction indicated by the control code. Specifically, the operation specified by the control code is executed by the inside-of-equipment controller 9. After the operation is executed, the device transmits a response to the issued instruction to the controller. The controller receives the response to recognize that the issued instruction is properly performed, and renews the operational screen display as required. In the case of receiving the response indicating occurrence of an error such as the case that the instruction is not properly performed in the device, the controller fetches the still picture sequence for display and the like for the error occasion from the function list 8 of the device, and thereby displays an error indication with using the same.

Communications made between the controller and the device through the transmission line 1 in the above way enables the user to make an instruction in the operational screen display for the device connected to the transmission line including a newly-connected device. In response to the instruction, the device is controlled with the function list to perform the function desired by the user. During such operation, when a change occurs in the internal status of the device connected to the transmission line 1, the device notifies the controller of information in which the change occurs by means of a predetermined identifier, for example. Upon receiving the notification, the controller deals with the change in information, and renews the operational screen display as required. In this way, the user can easily see a change in the status of the device connected to the transmission line 1.

The present embodiment described above comprises a controller having a user interface and a device having a function list indicating functions thereof, in which the device transmits the function list through a transmission line to the controller, and the controller notifies the information about the device to a user with using the function list and controls the device with the function list according to an instruction from the user, thereby making it possible to realize a user-friendly operational environment in a simple configuration and readily adapt to a device having a new function not conceivable at present. Moreover, the controller has the function lists of all devices which can be used, to speedily display the information about each device.

Besides, a device information layer indicating the information about the device and a function information layer indicating the functions of the device are provided in the function list, which respectively optimizes operational environments for each device and function of the device. Consequently, a user-friendly operational environment can be realized.

A device GUI layer and a function GUI layer describing user interface information about the device shown in the device information layer and function information layer are further included which make it possible to construct a flexible operational environment for each device or function.

Moreover, the function information layer is classified for each function of the device to have one or a plurality of commands for each function. This makes it possible to customize a user interface for each function, unify display of functions of all devices when displayed on the controller, and provide an easy-to-understand operational environment for a new function not conceivable at present.

Besides, an identifier is provided for each function described in the function information layer, thereby facilitating identification and retrieval of a function when managing or retrieving the function list with the controller.

The device GUI layer or function GUI layer is classified according to the operation of the user and the status of the device, which makes it possible to easily construct a user-friendly and easy-to-understand user interface.

Moreover, the function list has screen display data representing a device or function, thereby providing optimal screen display as for each device and function and providing a user-friendly operational screen display.

The device GUI layer or function GUI layer has screen display data for each category. Optimal screen display thus can be provided as for each category in each hierarchy, to deepen user's intuitive understanding and provide an operational screen display capable of supporting user's operation.

The function list includes screen display data which is data of a plurality of still pictures, and the controller sequentially displays the plurality of still picture data while switching the data every given time period. Thus, quasi-motion pictures can be displayed on the screen without an execution code operating in the controller, and more easyto-understand operational environment can be provided independently of the structure of the controller (a type of the CPU and the like).

Furthermore, the function list further includes screen display data consisting of data of a plurality of still pictures and a flag indicating a display method of the plurality of still picture data. This enables display of quasi-motion pictures, still pictures and the like suitable for each scene and specification of a reproducing speed of the quasi-motion picture. As a result, the intention of a GUI's creator becomes clearer to the user.

Besides, the function list further includes audio data, used for the user interface, such as audio data for a device or a function and the like, which makes it possible to provide the user with audio information appropriate for each device and function and realize a user-friendly operational environment.

The device GUI layer or the function GUI layer has audio data for each category, to provide the user with audio information appropriate for each category in each hierarchy and support/facilitate the user's understanding.

Furthermore, the function list further includes audio data and a flag indicating a reproduction method of the audio data. Thus, it is possible to specify the reproduction method of the audio data in detail in addition to simply offering audio, and provide the user with optimal audio information according to the scene.

Second Embodiment

A second embodiment of the present invention is described below with referring to the drawings.

Figure 10:
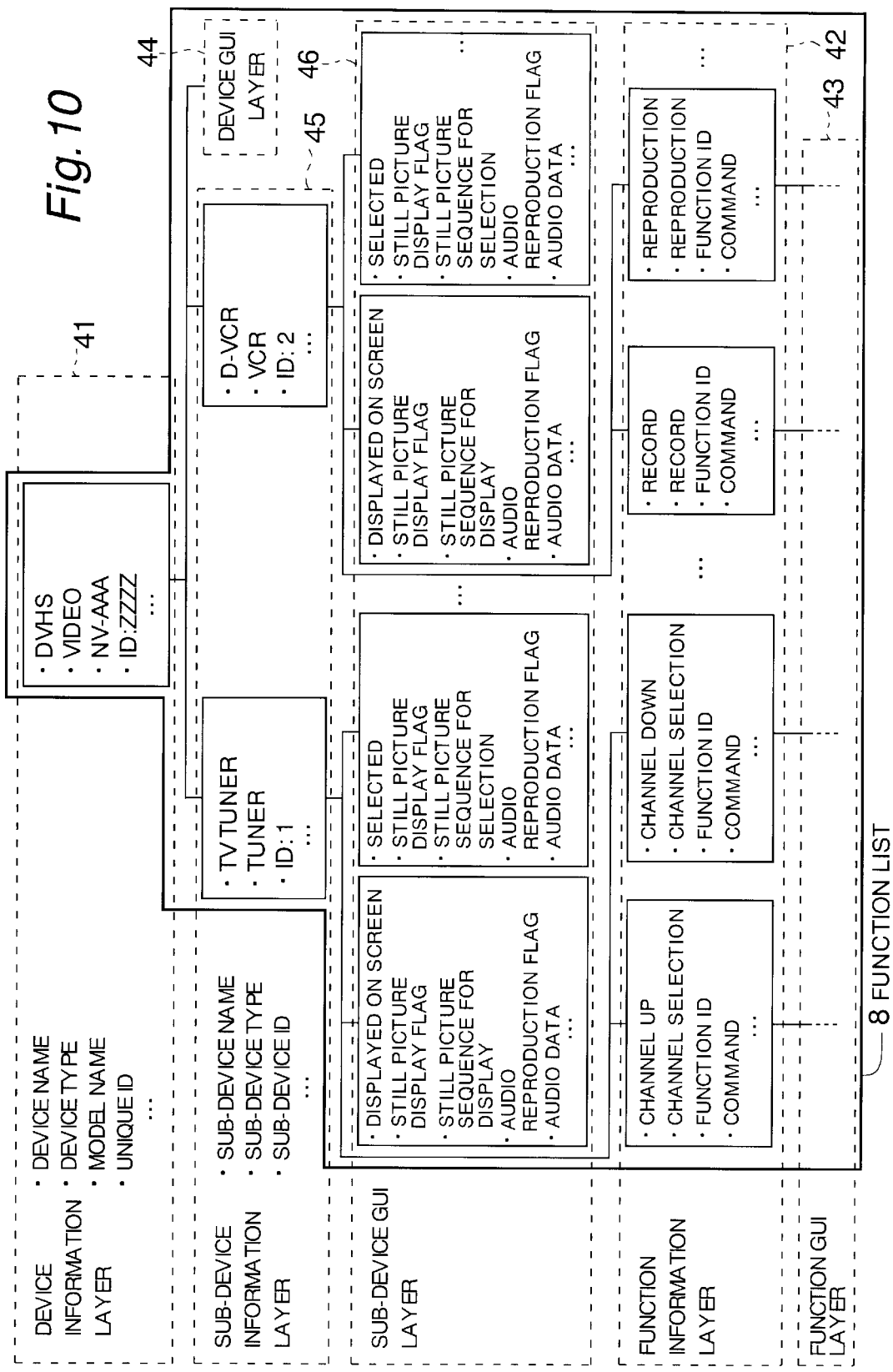
FIG. 10 illustrates a function list in a network control system according to a second embodiment of the present invention.

FIG. 10 illustrates a function list in a network control system according to the second embodiment of the present invention.

In FIG. 10, reference numerals 45 and 46 represent sub-devices information layer indicating information about a sub-devices and a sub-device GUI layer indicating GUI information for the sub-device, respectively. Here, the same constituents as those in the first embodiment are assigned the same reference numerals and the description thereof is omitted. Note that the sub-device in the present description refers to each device in the case where a plurality of devices are contained in one piece of equipment and the plurality of devices are collectively referred to as a device. For example, in the case of the DVHS 33 shown in FIG. 3, a digital terrestrial wave tuner and VCR capable of recording/reproducing video are respectively referred to as sub-devices.

FIG. 10 shows an example of the DVHS 33 equipped with the digital terrestrial wave tuner (TV tuner). In the device information layer 41, the device name, the device type, the model name, the unique ID and the like are described as information about the device. In the device GUI layer 44, the still picture sequence for display, the audio data and the like are described as GUI information of the device.

The sub-device information layer 45 is placed below the device information layer 41 and contains information about each sub-device (the TV tuner and the D-VCR in the present embodiment). Note that items described in the sub-device information layer 46 are a sub-device name denoting a name of a sub-device, a sub-device type expressing a type of the sub-device in a code, a sub-device ID for identifying the sub-device, and the like. The sub-device type is, for example, code data expressed by subunit_type of AV/C-CTS discussed by the 1394TA. The sub-device ID is obtained by assigning different numbers to each sub-device in one device. It is of course possible that different numbers are assigned to sub-devices of the same sub-device type as sub-device IDs. In this case, each sub-device is identified with the sub-device type and sub-device ID.

As in the case with the device information layer 41 and the function information layer 42, the sub-device information layer 45 has a sub-device GUI layer 46 in which GUI information of a sub-device (a still picture sequence for display, audio data and the like) is described.

The sub-device GUI layer 46 is classified according to the user's operation and the status of the device. Each category resulting from the classification has a GUI type expressing a type of a GUI in a code, the still picture display flag 52, a still picture sequence for display composed of one or a plurality of still pictures, the audio reproduction flag 53, audio data and the like. Here, the GUI type includes, for example, "display on screen" used when a device is displayed on the screen of the controller, "selected" displayed when the device is selected on the screen of the controller, "in operation" displayed on the screen of the controller when the device is in operation, "in use" used when the device is used by another controller, "error" displayed on the screen of the controller when the device does not accept an instruction from the controller, and the like. Note that in the "displayed on screen" category of the GUI type, information indicating description, specification and operational method of the sub-device may be included.

Below the sub-device information layer 45, placed is function information layer 42. To the function information layer 42, the function GUI layer 43 is added. The function information layer 42 and the function GUI layer 43 are identical with those in the first embodiment and the description thereof is omitted here.

Figure 11:
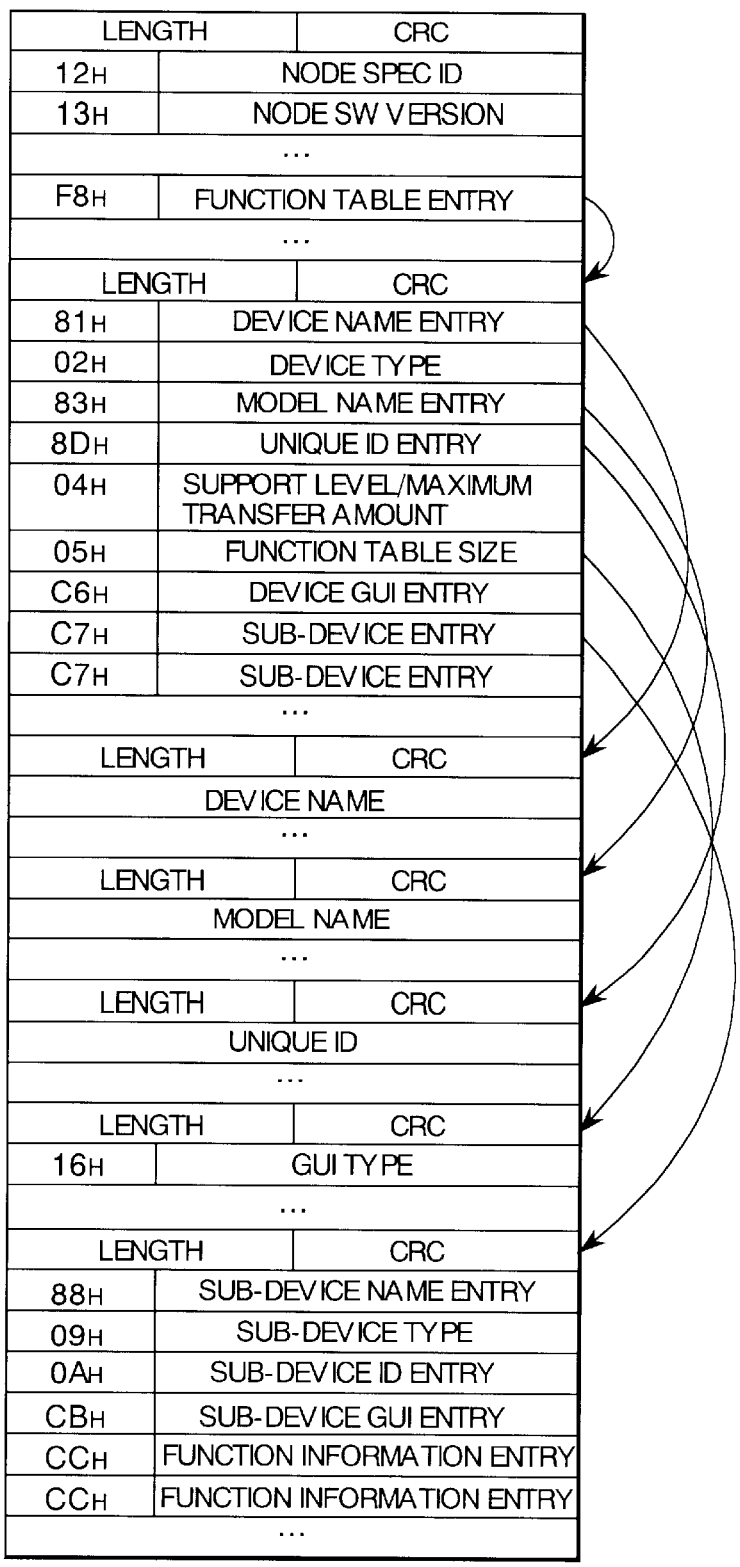
FIG. 11 shows a structure of a function table which is an example of the function list shown in FIG. 10.

FIG. 11 is a block diagram showing a function table which is an example of the function list in the second embodiment. As in the case with the function information entry in the first embodiment, a sub-device entry is disposed in the memory area of the device information layer 41. In the present embodiment, the area of the sub-device information layer 45 is disposed subsequent to the device information layer 41. In the sub-device information layer 45, a sub-device GUI entry and a function information entry are disposed. Note that each of a sub-device entry, sub-device name entry and the like here has an identifier for identifying the type of entry in the first one byte and indicates a relative address value to each directory of leaf in the remaining three bytes as in the case with the first embodiment. The first two bits of the identifier employ key_type expressed by the CSR architecture.

Description of the operation of the present embodiment is omitted here since it is the same as that in the first embodiment except that a unique ID and a sub-device ID are used for identifying a device in place of the unique ID. The sub-device ID is also used, when the controller controls the device, as a destination used when the controller transmits a command to the device.

As described in the above, the device information layer indicating information about a device, the sub-device information layer indicating information about a sub-device in said device, and the function information layer indicating functions of said sub-device are provided. It is thus possible to provide an appropriate operational environment for each sub-device in each device, and control each device on a sub-device basis from different controllers.

The sub-device GUI layer describing user interface information of the sub-device indicated in the sub-device information layer 45 is provided, whereby a flexible user interface can be constructed for each sub-device and an optimal and user-friendly operational environment can be realized for each sub-device.

Third Embodiment

Described below is a third embodiment of the present invention with referring to the drawings.

Figure 12:
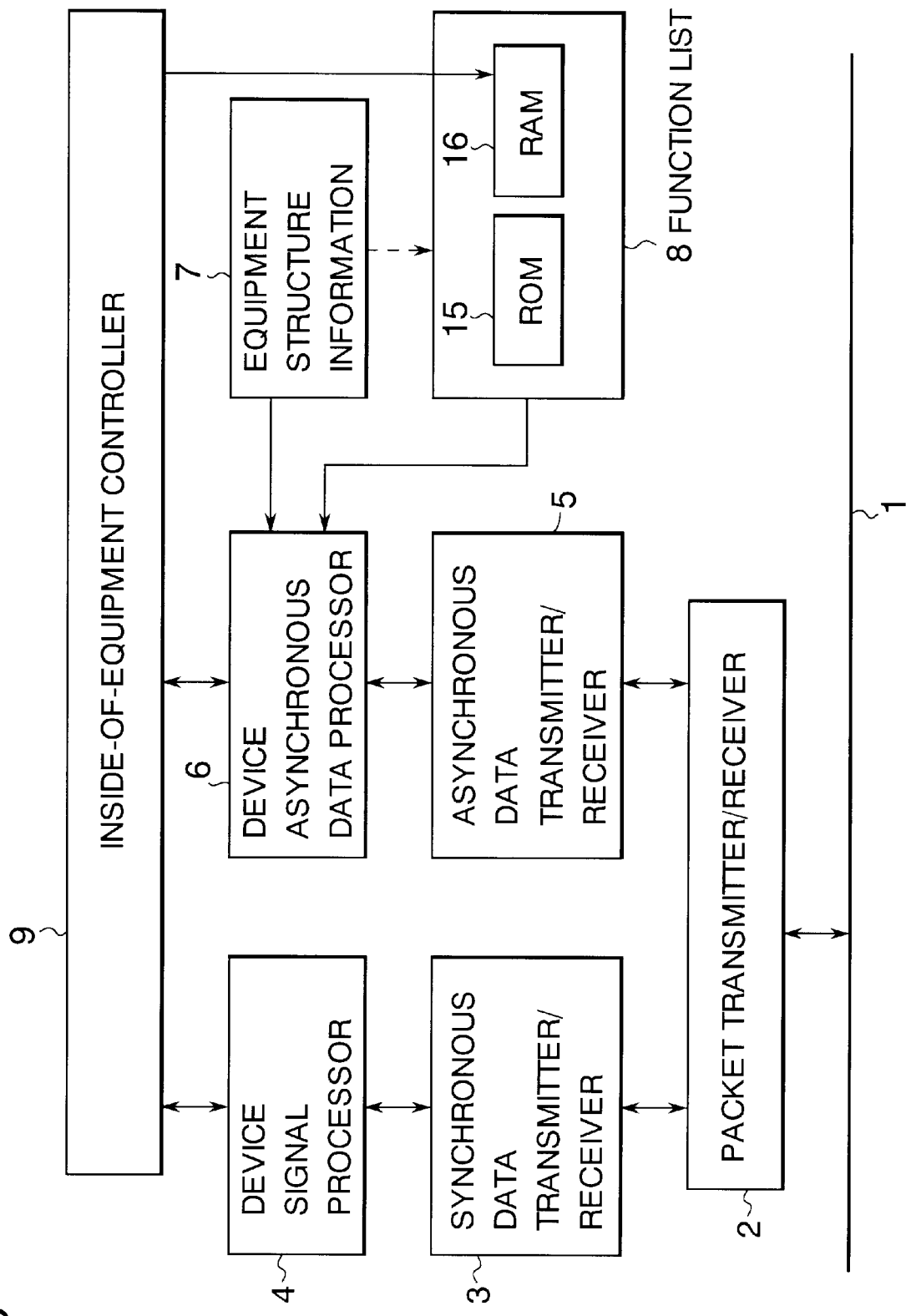
FIG. 12 is a block diagram showing a structure of a device in a network control system according to a third embodiment of the present invention.

FIG. 12 is a block diagram showing a structure of a device in a network control system according to the third embodiment.

In FIG. 12, a reference numeral 15 stands for ROM (Read Only Memory) as a non-rewritable memory area where a part of the function list 8 is disposed, and a reference numeral 16 stands for RAM (Random Access Memory) as a rewritable memory area where a part of the function list 8 is disposed. Constituents identical with those in the first embodiment are assigned the same reference numerals and the description thereof is omitted.

In the present embodiment, the function list 8 is disposed not only in ROM 15 but also in RAM 16. In RAM 16 where the function list 8 is disposed, the inside-of-equipment controller 9 writes information as required. The information to be written here is, for example, information indicating the contents, that is, attribute information including identification information for the contents (hereinafter, such attribute information for the contents is simply referred to as "contents information"), more specifically, currently-broadcast program information (information about the title of the program, title screen display, theme music, synopses, cast, and the like) in the case of the STB, and information about the contents recorded in a DVD disk (information about the title, title screen, theme music, synopses, cast, and the like) in the case of the DVD. Additionally, identification information of the controller using the device, status information of the equipment may be written in RAM 16.

Figure 13:
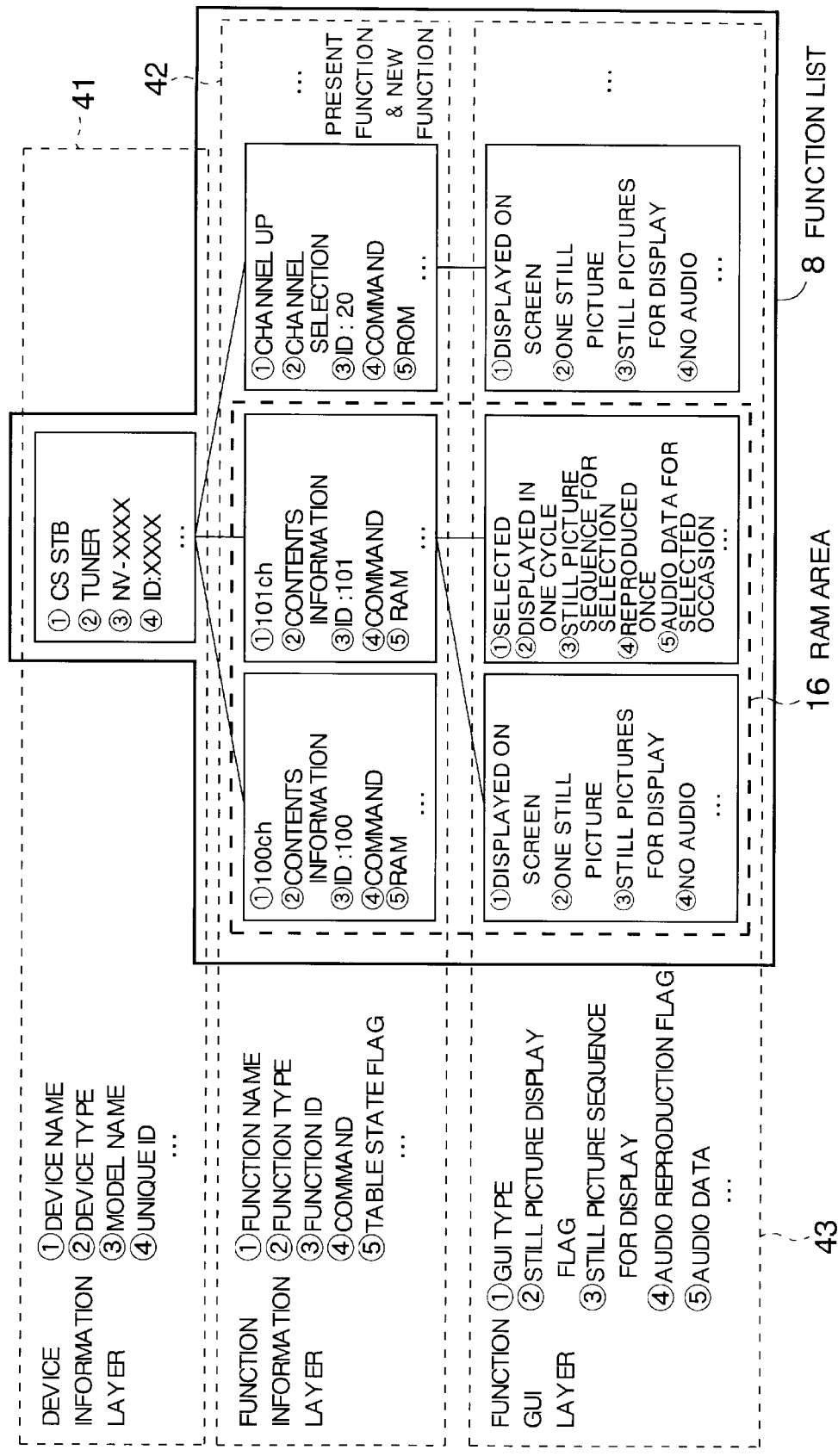
FIG. 13 illustrates an exemplary function list in the network control system according to the third embodiment.

FIG. 13 illustrates an exemplary function list in the present embodiment. The example for the STB is described. It should be noted that the device GUI layer 44 is omitted here.

In FIG. 13, in RAM 16 in the function list 8, every time the contents broadcast on each channel of the STB change, the inside-of-equipment controller 9 rewrites the corresponding part in the function information layer 42 and the function GUI layer 43. For example, in the case where the broadcast contents on a channel 101 (101ch) change, the inside-of-equipment controller 9 rewrites the still picture sequence for display and audio data for "displayed on screen" in the function GUI layer 43. If the still picture display flag 52 and audio reproduction flag 53 must be rewritten to change the still picture sequence for display and audio data, the still picture display flag 52 and audio reproduction flag 53 are rewritten at the same time. Moreover, in the case where a command controlling the device is changed due to the change in the broadcast contents, for example, the corresponding function information layer 42 is rewritten. When the broadcast on the channel ends, the function information layer 42 and the function GUI layer 43 are deleted.

Note that a table state flag is added to the function information layer 42 in the present embodiment.

Figure 14:
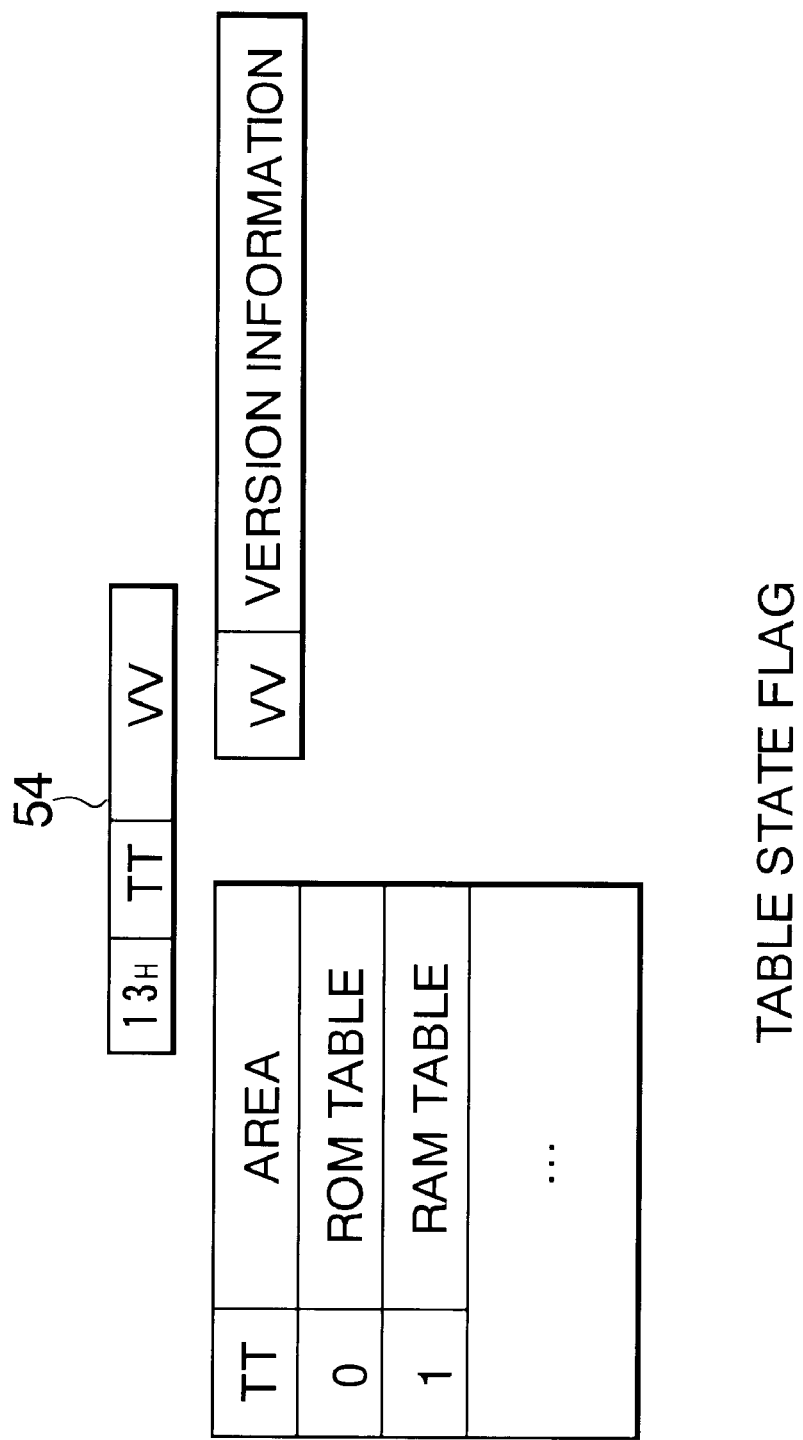
FIG. 14 shows a structure of an exemplary table state flag in the network control system according to the third embodiment.

FIG. 14 is a block diagram showing an exemplary table state flag in the present embodiment. A reference numeral 54 represents the table state flag where the first one byte (13H in FIG. 14) is an identifier indicating the table state flag 54, and the next four bits "TT" express in a code whether the information corresponding to each of the function in the function information layer 42 is disposed in a non-rewritable area or a rewritable area. The remaining twenty bits "VV" represents version information and is a figure to which one is added each time the information in RAM 16 where the function list 8 is disposed is rewritten. It is obvious that in the case where the information in RAM 16 might be frequently rewritten, the flag may be extended to have more bits for the version information.

Figure 15:
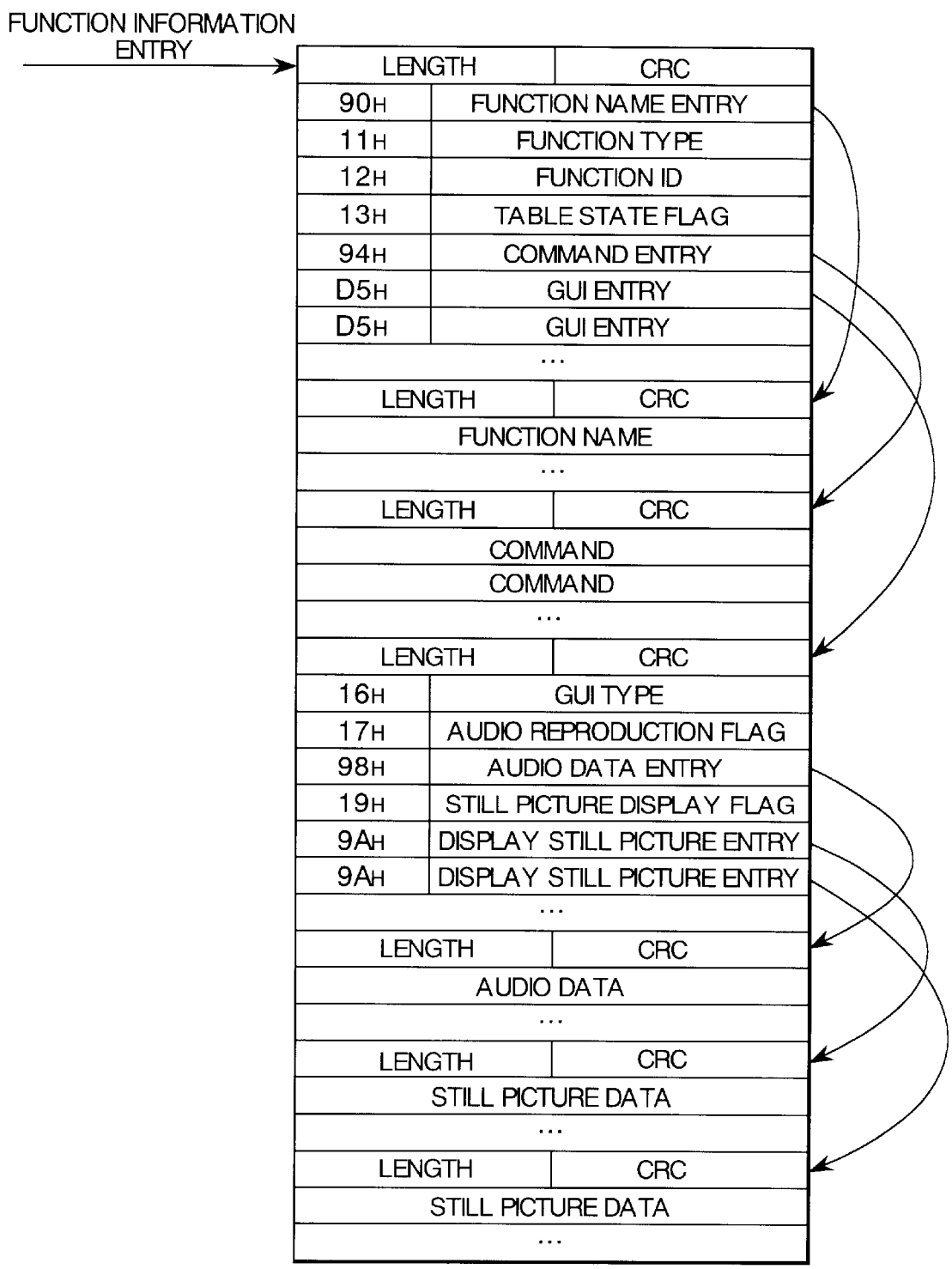
FIG. 15 shows a structure of an exemplary function list in the network control system according to the third embodiment.

FIG. 15 is a block diagram showing an exemplary function list in the third embodiment. FIG. 15 shows the function information layer 42 and function GUI layer 43 which have areas as shown in FIG. 15 for each function. The items in the area of the table state flag 54 are set depending on the areas where the function information layer 42 and function GUI layer 43 are disposed.

Each entry and the like in the areas has an identifier for identifying the type of entry in the first one byte as in the case with the first embodiment, and indicates a relative address value to each directory or leaf in the remaining three bytes. Note that key_type expressed in the CSR architecture is used here in the first two bits of the identifier.

Described next is operation of the present embodiment.

First, when a device is connected to the transmission line 1, a controller on the transmission line 1 recognizes the new device, for example, by means of bus reset and the like in the case of the 1394 bus, then reads the function list 8 from the new device with using the function list managing portion 12, and copies and registers the information of the function list 8 to/in the function database 13 of the controller. The screen display/equipment function selection portion 14 refers to the function list 8 in the function database 13 through the function list managing portion 12. When the list of devices connected to the controller is displayed according to the user's manipulation of a remote controller and the like, the screen display/equipment function selection portion 14, while using the function list managing portion 12, reads the device name and device type in the device information layer 41, the still picture sequence for display in the device GUI layer 44, and the like from the function lists 8 of all devices registered in the function list managing portion 12, and displays the same on the screen.

Next, when the user selects, for example, the STB whose unique ID is XXXX by means of the pointing function of the remote controller (e.g. a cross key) and the like, the screen display/equipment function selection portion 14 reads the still picture sequence for display and the like for the selected occasion in the device GUI layer 44, and displays the same on the screen. After that, the screen display/equipment function selection portion 14, while using the function list managing portion 12, reads the still picture sequence for display in the function GUI layer 43 for each function described in the function information layer 42 from the function list 8 of the device, and display the same on the screen based on an instruction from the still picture display flag 52. In this way, the graphics representing the functions and the contents information of the device is displayed on the screen. The screen display/equipment function selection portion 14 grasps the possibility that the each function is rewritten and version information form the table state flag 54 through the function list managing portion 12. In the where there is a possibility that a function is rewritten, the function list managing portion 12 monitors the corresponding function in the function list 8 of the device at periodic time intervals. While the function list 8 of the device is monitored here at periodic time intervals, the function list 8 of the device may be checked when a cursor is located on or moved onto graphics representing the function which might be rewritten. Thus, the traffic on the transmission line 1 can be decreased, and update information can be provided in accordance with the user's intention.

Furthermore, for example, when the user moves the cursor onto graphics representing the contents information of the 101ch by means of the pointing function and the like of the remote controller, the screen display/equipment function selection portion 14, while using the function list managing portion 12, fetches audio data again in the "displayed on screen" category in the function GUI layer 43 whose function information layer is for 101ch, and reproduces the audio data based on an instruction of the audio reproduction flag 53. The audio data may be, for example, audio explaining the function, some melody, or audio indicating a selection method. In the case where the user moves the cursor onto graphics representing the reproduction function of the device, the screen display/equipment function selection portion 14 reproduces audio data not immediately but only when the cursor has still been located in the present position even after a lapse of time (e.g. almost a second) required to predict that the user's intention is directed to the function.

The operation in the case that the user selects graphics representing each function, for example, the contents information of the 101ch and that the device does not accept the command transmitted by the controller for some reason is the same as that in the first embodiment, and therefore the description thereof is omitted.

When the information in the device that might be rewritten (e.g. the contents information) changes, the device rewrites a directory indicating the corresponding function in the function information layer 42 in its function list 8. In the controller, the function list managing portion 12 monitors at periodic time intervals a function that might be rewritten in RAM 16 in the function list 8 in the device. When the corresponding function in RAM 16 in the function list 8 in the device is rewritten, the function list managing portion 12 fetches new data of the corresponding function via transmission line 1, then rewrites the corresponding function in the function list 8 of the device in the function database 13, and notifies the screen display/equipment function selection portion 14 that the corresponding function is rewritten. In response to this, the screen display/equipment function selection portion 14 fetches screen display data and the like of the corresponding function from the function list 8 in the function database 13, and displays the same on the screen or reproduces audio data. When the information that might be rewritten in the device changes, the controller monitors the change and fetches data here, however, it is possible that the device transmits the information to the controller. In this case, the necessity to fetch the information is obviated, whereby the traffic on the transmission line 1 and the load on the controller can be reduced and the configuration can be simplified. Particularly, the contents information that might be frequently rewritten is transmitted to the controller without a request from the controller, thereby significantly reducing the traffic on the transmission line and the load on the controller.

The status of a device is described in RAM 16 in the function list 8. The controller can thus grasp the entire status of the device at a time when monitoring the status of the device, thereby making it possible to decrease the traffic on the transmission line 1 and facilitate the processing in the controller. Moreover, the device does not have to respond to each inquiry about its status. As a result, the processing of the device can be simplified and the load on the device can be reduced.

As described above, according to the present embodiment, a non-rewritable area and a rewritable area are included in the function list in the device, whereby information that ceaselessly changes as well as information fixed in the device can be provided to the controller in a simple configuration, and changing information can be speedily provided to the user.

When the contents in the rewritable area changes, the device notifies the controller that the contents in said rewritable area change. This obviates the necessity for the controller to monitor the information about the device, and reduces the traffic on the transmission line and the load on the controller.

In the rewritable area in the function list in the device, said device stores the information about the currently-reproducible contents, whereby information changing with time, especially the contents information to be a basis of user's operation of the equipment can be readily and speedily fetched.

Furthermore, when contents reproducible by the device change, the device transmits to the controller the information about the contents that becomes newly reproducible. This obviates the necessity for the controller to monitor the contents information and fetch the contents information that might frequently change. As a result, the load on the controller can be reduced, the configuration can be simplified.

In the rewritable area in the function list in the device, the device stores a response to a request from the controller. Therefore, when there are a lot of responses, the device has only to write the responses in the rewritable area in the function list. That is, a job such as dividing and transmitting the responses can be omitted, and therefore the load on the device can be reduced.

In the rewritable area in the function list in the device, the status information of the device is stored. This obviates the necessity for the controller to issue various commands to confirm the status of the device. Therefore, entire information about the controller can be fetched at a time. Consequently, the load on the controller can be reduced, and the traffic on the transmission line can be decreased.

Furthermore, a flag indicating whether a directory in the function list in the device is disposed in the rewritable area or non-rewritable area is provided, thereby allowing the controller to readily confirm for each directory whether the information might be rewritten or not. Thus, the controller has only to check the information that might be rewritten, whereby the load on the controller can be reduced.

While the still picture sequence for display and audio data are used in the device GUI layer, the function GUI layer or the sub-device GUI layer in the above embodiments, screen display and audio output of the controller may be realized by an execution code executable in the controller and a byte code assuming a virtual machine. In this case, although constraints are added to the structure of the controller (a type of CPU, support for the virtual machine and the like), the same effect can be obtained.

Others

In each embodiments described in the above, the equipment connected to the transmission line 1 handles at least one of video, audio, and information. However, equipment which does not directly relate to any of video, audio, and information, for example, an air conditioner and the like may be connected to the transmission line 1 as equipment (device) to be controlled by the controller. The present invention can be applied to a network control system in which such equipment is interconnected.

INDUSTRIAL APPLICABILITY

The present invention is applied to a network control system for operating over a network equipment interconnected on the network, more specifically to an equipment control system providing on a screen a graphical user interface (GUI) for supporting user's operation of equipment by means of graphics, characters and the like. The present invention is suitable for, for example, a network control system in which a plurality of AV equipment are interconnected by a transmission line such as a serial bus of the IEEE standard 1394 and equipment having the GUI controls other equipment through the transmission line.

What is claimed is:

1. A network control system comprising:
a plurality of equipment connected through a transmission line, said plurality of the equipment including at least a first equipment and a second equipment, said first equipment operable to control said second equipment through said transmission line;
wherein:
at least one of said first and second equipment handles at least one of video data, audio data, and, information data;
said first equipment includes a controller having a user interface;
said second equipment includes a device to be controlled by said controller;
said device has function information arranged in a plurality of layers including a device information layer, a function information layer, a function GUI information layer, and a device GUI layer, said function information indicating functions of said device and includes user interface information indicating each of the functions of said device and an identifier corresponding to each of the user interface information;
said device operates in accordance with the identifier received from said controller through said transmission line to realize the function indicated by said user interface information corresponding to the identifier; and
said controller acquires the function information form said device through said transmission line, presents each of the functions of said device to a user through the use of the user interface information included in the function information, and transmits the identifier corresponding to said user interface to said device through said transmission line in response to a user's operation performed by said user interface for the user interface information.

2. The network control system according to claim 1, wherein:
the user interface information includes display data;
said controller has a display device for said user interface, displays the functions of said device with said display device through the use of the display data to present the functions to the user, and transmits the identifier corresponding to the display data to said device through said transmission line according to the user's operation performed by said user interface for the display data; and
said device operates in accordance with the identifier received from said controller through said transmission line to realize the function indicated by the display data corresponding to the identifier.

3. The network control system according to claim 1, wherein:
the device information layer comprises at least one of a device name, a device type, a model name, and a unique ID;
the function information layer comprises at least one of a function name, a function type, a function ID and a command;
the function GUI layer comprises at least one of a GUI type, a still picture display flag, a still picture sequence for display, an audio reproduction flag, and audio data; and
the device GUI layer comprises one of a GUI type, a still picture display flag, a still picture sequence for display, and audio reproduction flag, and audio data.

4. A apparatus comprising:
a second equipment connected to a first equipment through a transmission line, said second equipment comprising a device to be controlled through said transmission line by a controller included in said first equipment;
wherein:
at least one of said first and second equipment handles at least one of video data, audio data, and information data;
said device has function information arranged in a plurality of layers including a device information layer, a function information layer, a function GUI information layer, and a device GUI layer, said function information indicating functions of said device and includes user interface information indicating each of the functions of said device and an identifier corresponding to each of the user information; and
said device operates in accordance with the identifier received from said controller through said transmission line to realize the function indicated by the user interface information corresponding to the identifier.

5. The apparatus according to claim 4, wherein:
the user interface information includes display data; and
said device operates in accordance with the identifier received from said controller through said transmission line to realize the function indicated by the display data corresponding to the identifier.

6. The apparatus according to claim 4, wherein:
the device information layer comprises at least one of a device name, a device type, a model name, and a unique ID;
the function information layer comprises at least one of a function name, a function type, a function ID, and a command;
the function GUI layer comprises at least one of a GUI type, a still picture display flag, a still picture sequence for display, and audio reproduction flag, and audio data; and
the device GUI layer comprises one of a GUI type, a still picture display flag, a still picture sequence for display, and audio reproduction flag, and audio data.

7. An apparatus comprising:
a first equipment connected to a second equipment through a transmission line, said first equipment comprising a controller controlling a device include in said second equipment through said transmission line;

wherein:
   at least one of said first and second equipment handles at least one of video data, audio data, and information data;
   said controller comprises a user interface, and acquires, from said device through said transmission line, function information arranged in a plurality of layers including a device information layer, a function information layer, a function GUI information layer and a device GUI layer, said function information indicating each of functions of said device and an identifier corresponding to each of the user interface information, and controls said device by presenting to a user each of the functions of said device through the use of the user interface information, and transmitting the identifier corresponding to the user interface information through said transmission line in response to a user's operation performed by said inter face for the user interface information; and
the device information layer contains information about all other layers included in the function information, whereby said controller is operable to determine a level of support of the functions of said device by referring to said device information layer.

8. The apparatus according to claim 7, wherein:
the user interface information includes display data; and
said controller has a display device for said user interface, displays the functions of said device with said display device through the use of the display data to present the functions to the user, and transmits the identifier corresponding to the display data to said device through said transmission line according to the user's operation performed by said user interface for the display data to control said device.

9. The apparatus according to claim 7, wherein:
the device information layer comprises at least one of a device name, a device type, a model name, and a unique ID;
the function information layer comprises at least one of a function name, a function type, a function ID, and a command;
the function GUI layer comprises at least one of a GUI type, a still picture display flag, a still picture sequence for display, and audio reproduction flag, and audio data; and
the device GUI layer comprises one of a GUI type, a still picture display flag, a still picture sequence.

* * * * *